(12) United States Patent
Abdellatif et al.

(10) Patent No.: US 11,584,458 B2
(45) Date of Patent: Feb. 21, 2023

(54) INSPECTION METHOD USING A PERCHING UAV WITH A RELEASABLE CRAWLER

(71) Applicants: SAUDI ARABIAN OIL COMPANY, Dhahran (SA); KING ABDULLAH UNIVERSITY OF SCIENCE AND TECHNOLOGY, Thuwal (SA)

(72) Inventors: Fadi Abdellatif, Thuwal (SA); Mohamed Abdelkader, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 335 days.

(21) Appl. No.: 16/694,092

(22) Filed: Nov. 25, 2019

(65) Prior Publication Data

US 2020/0174478 A1    Jun. 4, 2020

Related U.S. Application Data

(60) Provisional application No. 62/772,700, filed on Nov. 29, 2018, provisional application No. 62/772,700, filed on Nov. 29, 2018.

(51) Int. Cl.
*B62D 57/024* (2006.01)
*B60K 1/02* (2006.01)
(Continued)

(52) U.S. Cl.
CPC ............ *B62D 57/024* (2013.01); *B60G 3/01* (2013.01); *B60G 11/00* (2013.01); *B60K 1/02* (2013.01);
(Continued)

(58) Field of Classification Search
CPC ................................................ B62D 57/024
See application file for complete search history.

(56) References Cited

U.S. PATENT DOCUMENTS

| 5,435,405 A | * | 7/1995 | Schempf | B62D 55/265 |
| | | | | 901/44 |
| 7,784,812 B1 | * | 8/2010 | Lares | B62D 61/12 |
| | | | | 180/14.4 |

(Continued)

FOREIGN PATENT DOCUMENTS

| CN | 103192987 B | 6/2015 | | |
| EP | 2099672 B1 | * 8/2011 | ........... | B62D 57/024 |

(Continued)

OTHER PUBLICATIONS

International Search Report and Written Opinion in Corresponding PCT Application No. PCT/US2019/063400 dated Jul. 16, 2020. 12 pages.

*Primary Examiner* — Jean Paul Cass
(74) *Attorney, Agent, or Firm* — Leason Ellis LLP

(57) ABSTRACT

A method of inspection or maintenance of a curved ferromagnetic surface using an unmanned aerial vehicle (UAV) having a releasable crawler is provided. The method includes: flying the UAV from an initial position to a pre-perching position in a vicinity of the ferromagnetic surface; autonomously perching the UAV on the ferromagnetic surface; maintaining magnetic attachment of the perched UAV to the ferromagnetic surface; releasing the crawler from the magnetically attached UAV onto the ferromagnetic surface; moving the crawler over the curved ferromagnetic surface while maintaining magnetic attachment of the released crawler to the ferromagnetic surface; inspecting or maintaining the ferromagnetic surface using (Continued)

the magnetically attached crawler; and re-docking the released crawler with the perched UAV.

22 Claims, 14 Drawing Sheets

(51) Int. Cl.
*B62D 21/09* (2006.01)
*B60G 3/01* (2006.01)
*B60G 11/00* (2006.01)
*B62D 61/12* (2006.01)
*B60R 11/00* (2006.01)
*G01N 29/265* (2006.01)
*G01N 29/04* (2006.01)
*B62D 9/00* (2006.01)
*B64C 25/24* (2006.01)
*B64C 25/36* (2006.01)
*B64C 25/40* (2006.01)
*B64C 39/02* (2006.01)
*B64D 1/02* (2006.01)
*G01B 17/02* (2006.01)
*G05D 1/00* (2006.01)
*G05D 1/10* (2006.01)
*B64C 25/32* (2006.01)
*G06T 7/50* (2017.01)
*G01S 17/86* (2020.01)
*G01S 17/89* (2020.01)
*H04N 5/222* (2006.01)
*G06V 20/10* (2022.01)

(52) U.S. Cl.
CPC .............. *B60R 11/00* (2013.01); *B62D 9/002* (2013.01); *B62D 21/09* (2013.01); *B62D 61/12* (2013.01); *B64C 25/24* (2013.01); *B64C 25/32* (2013.01); *B64C 25/36* (2013.01); *B64C 25/405* (2013.01); *B64C 39/02* (2013.01); *B64C 39/024* (2013.01); *B64D 1/02* (2013.01); *G01B 17/02* (2013.01); *G01N 29/04* (2013.01); *G01N 29/265* (2013.01); *G01S 17/86* (2020.01); *G01S 17/89* (2013.01); *G05D 1/0088* (2013.01); *G05D 1/0094* (2013.01); *G05D 1/101* (2013.01); *G06T 7/50* (2017.01); *G06V 20/10* (2022.01); *H04N 5/2226* (2013.01); *B60R 2011/004* (2013.01); *B60R 2011/008* (2013.01); *B60R 2011/0084* (2013.01); *B64C 2201/027* (2013.01); *B64C 2201/12* (2013.01); *B64C 2201/123* (2013.01); *B64C 2201/127* (2013.01); *B64C 2201/141* (2013.01); *B64C 2201/18* (2013.01); *G01N 2291/0289* (2013.01); *G01N 2291/02854* (2013.01); *G06T 2207/10028* (2013.01)

(56) References Cited

U.S. PATENT DOCUMENTS

| | | | |
|---|---|---|---|
| 10,023,326 | B2 * | 7/2018 | Byers .................. B64F 1/12 |
| 10,081,421 | B2 | 9/2018 | Semke et al. |
| 10,377,486 | B2 | 8/2019 | Kratz et al. |
| 10,633,093 | B2 * | 4/2020 | Castillo-Effen ....... G06T 19/003 |
| 10,698,412 | B2 * | 6/2020 | Loosararian ......... G01N 29/043 |
| 2016/0137304 | A1 | 5/2016 | Phan et al. |
| 2020/0095074 | A1 * | 3/2020 | Byers .................. B66C 1/06 |
| 2020/0174129 | A1 * | 6/2020 | Abdelkader ......... G05D 1/0094 |
| 2021/0142271 | A1 * | 5/2021 | Burch, V .............. G01S 5/0018 |

FOREIGN PATENT DOCUMENTS

| | | | | |
|---|---|---|---|---|
| EP | 3315406 | A1 | 5/2018 | |
| GB | 2532295 | A | 5/2016 | |
| JP | 2017115787 | A | 6/2017 | |
| KR | 101491076 | B1 | 2/2015 | |
| WO | 2016144627 | A1 | 9/2016 | |
| WO | WO-2018092392 | A1 * | 5/2018 | ......... H01F 27/2847 |

* cited by examiner

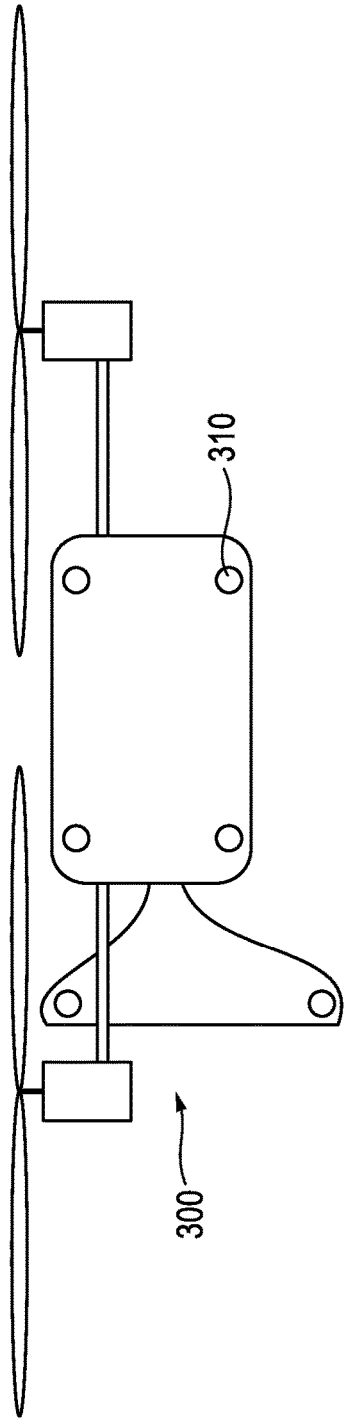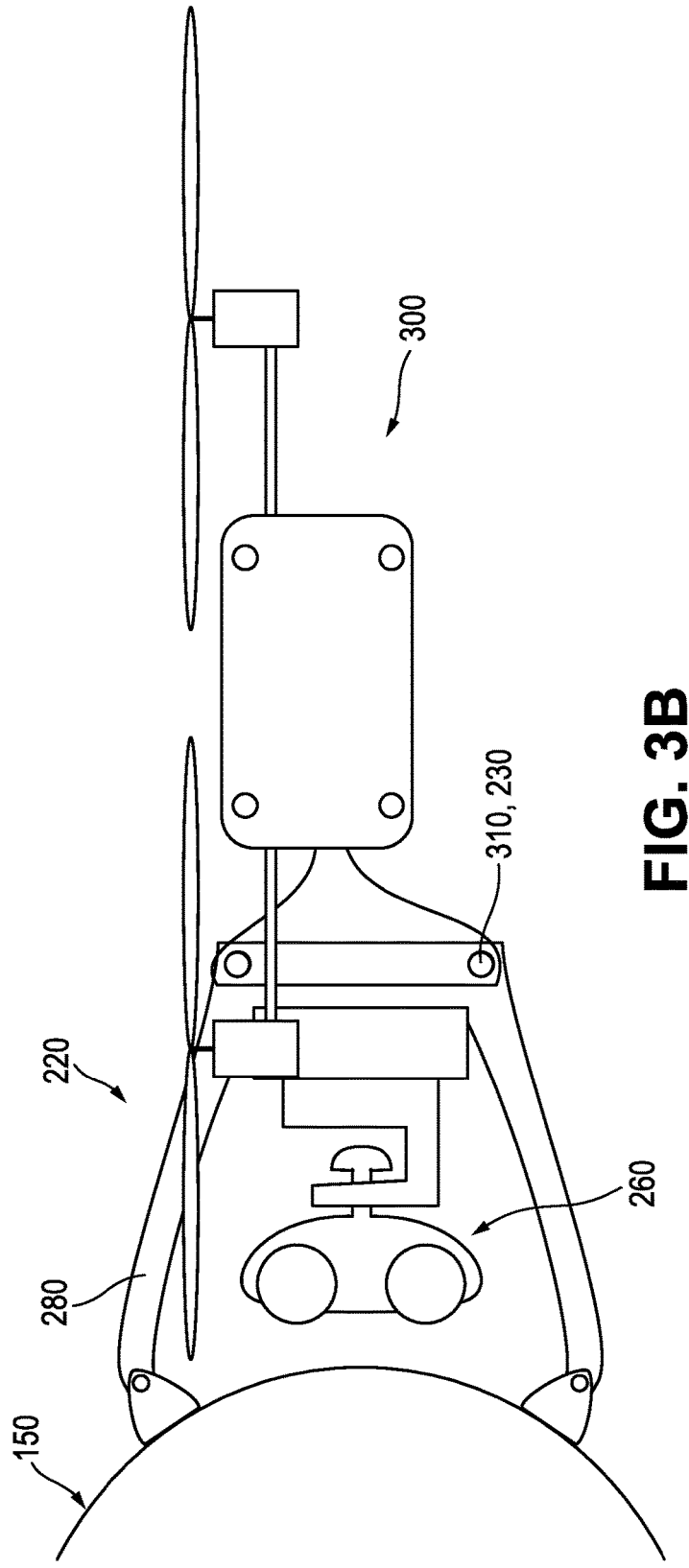
FIG. 3A
FIG. 3B

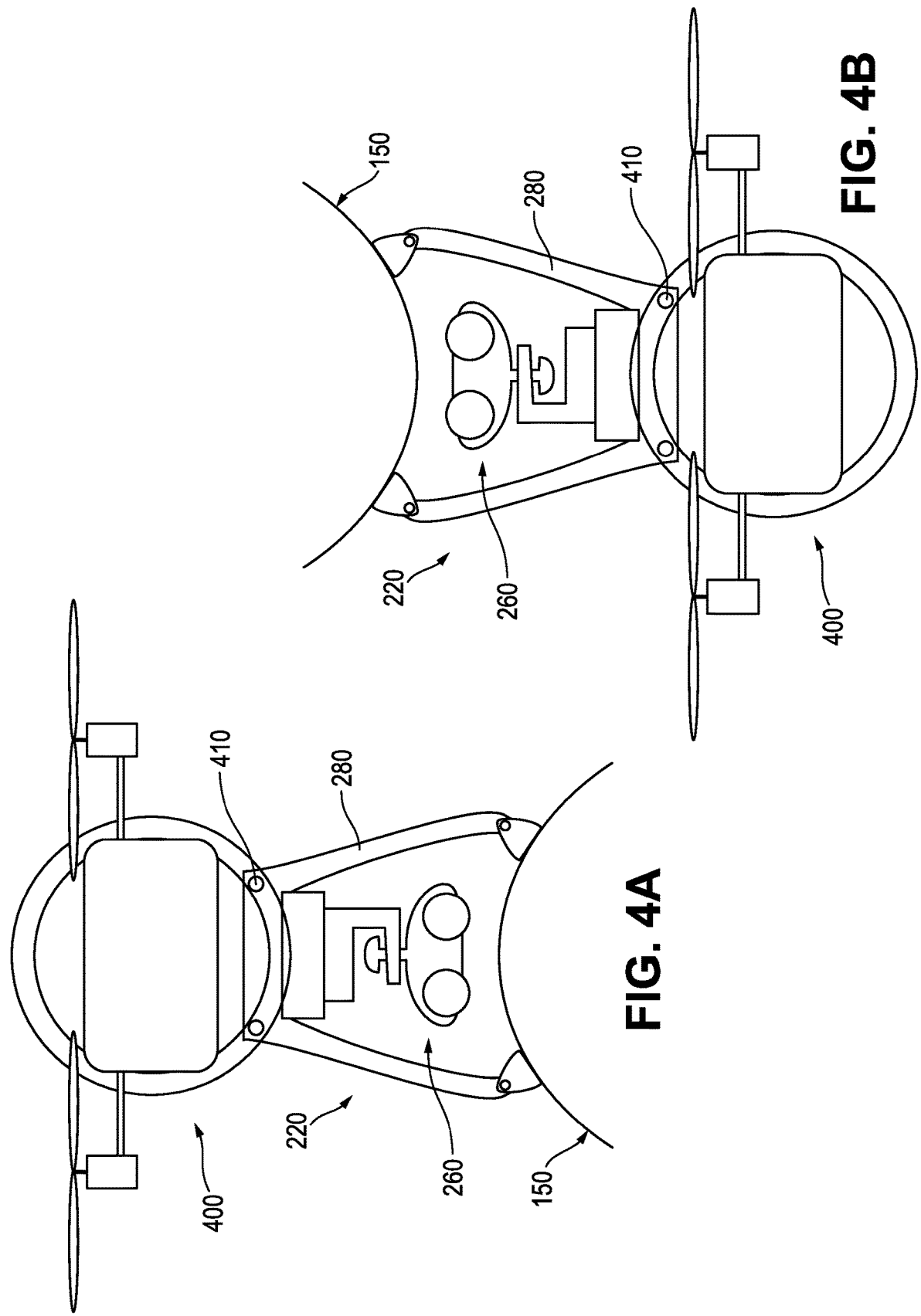

INSPECTION METHOD USING A PERCHING UAV WITH A RELEASABLE CRAWLER

CROSS-REFERENCE TO RELATED APPLICATION

The present application claims the benefit of U.S. Provisional Application No. 62/772,700, titled PERCHING UAV WITH RELEASABLE CRAWLER, filed on Nov. 29, 2018 with the U.S. Patent and Trademark Office, which is hereby incorporated by reference in its entirety.

FIELD OF THE DISCLOSURE

The present disclosure relates generally to the inspection and maintenance of a structure, and specifically to an inspection method using a perching unmanned aerial vehicle (UAV) having a releasable and re-dockable crawler for inspecting and maintaining the structure.

BACKGROUND OF THE DISCLOSURE

The inspection and maintenance of exposed metallic assets, such as pipes, storage tanks, and the like, can be difficult or impractical to perform by humans in some environments. In such circumstances, the use of automated UAV's (or drones) may assist in providing a workable alternative. However, such inspection and maintenance tasks are often best performed using direct contact on the asset, versus hovering at a distance from the asset, or maneuvering a UAV on the asset. In particular, performing a complete circumferential scan of a pipe (or other asset) using a drone is a challenging task.

It is in regard to these and other problems in the art that the present disclosure is directed to provide a technical solution for an effective inspection method using a perching UAV having a releasable and re-dockable crawler.

SUMMARY OF THE DISCLOSURE

According to an embodiment, a method of inspection or maintenance of a curved ferromagnetic surface using an unmanned aerial vehicle (UAV) having a releasable crawler is provided. The method comprises: flying the UAV to a proximity of the ferromagnetic surface; and perching the UAV on the ferromagnetic surface. The perching of the UAV comprises: passively articulating legs of the UAV toward the curvature of the ferromagnetic surface using corresponding magnets in the legs while approaching the ferromagnetic surface; magnetically attaching the articulated legs of the UAV to the ferromagnetic surface using the corresponding magnets; and maintaining the magnetic attachment of the legs to the ferromagnetic surface throughout the perching. The method further comprises: detaching the crawler onto the ferromagnetic surface from the perched UAV; and maneuvering the detached crawler on the ferromagnetic surface while magnetically attaching the crawler to the ferromagnetic surface using magnetic wheels of the crawler.

In an embodiment, the curved ferromagnetic surface comprises a pipe, and maneuvering the detached crawler comprises performing circumferential scans of the pipe using the detached crawler.

In an embodiment, the method further comprises inspecting or maintaining the ferromagnetic surface during the maneuvering using a probe or tool of the crawler.

In an embodiment, the method further comprises wirelessly communicating, from the detached crawler, with the UAV or a base station.

In an embodiment, the method further comprises breaking the magnetic attachment of the crawler from the ferromagnetic surface and re-docking the detached crawler with the perched UAV after the maneuvering.

In an embodiment, the method further comprises: breaking the magnetic attachment of the articulated legs from the ferromagnetic surface; and flying the magnetically detached legs of the UAV away from the ferromagnetic surface.

In an embodiment, the corresponding magnets comprise switchable permanent magnets, and breaking the magnetic attachment comprises switching the permanent magnets from a magnetized state to an unmagnetized state.

In an embodiment, breaking the magnetic attachment comprises applying leverage to the magnetically attached legs using one or more detachment actuators of the UAV.

In an embodiment, the method further comprises scanning the proximal ferromagnetic surface using a laser scanner of the flying UAV.

According to an embodiment, a method of inspection or maintenance of a curved ferromagnetic surface using an unmanned aerial vehicle (UAV) having a releasable crawler is provided. The method comprises: flying the UAV from an initial position to a pre-perching position in a vicinity of the ferromagnetic surface; autonomously perching the UAV on the ferromagnetic surface; maintaining magnetic attachment of the perched UAV to the ferromagnetic surface; releasing the crawler from the magnetically attached UAV onto the ferromagnetic surface; moving the crawler over the curved ferromagnetic surface while maintaining magnetic attachment of the released crawler to the ferromagnetic surface; inspecting or maintaining the ferromagnetic surface using the magnetically attached crawler; and re-docking the released crawler with the perched UAV.

In an embodiment, the method further comprises wirelessly communicating with the UAV from the released crawler.

In an embodiment, the method further comprises: magnetically detaching the perched UAV from the ferromagnetic surface; and flying the magnetically detached UAV away from the ferromagnetic surface to the pre-perching position.

In an embodiment, flying the magnetically detached UAV comprises not carrying the re-docked crawler, and the method further comprises wirelessly communicating with the flying UAV from the released crawler.

In an embodiment, inspecting or maintaining the ferromagnetic surface comprises marking locations of interest on the ferromagnetic surface.

In an embodiment, inspecting or maintaining the ferromagnetic surface comprises measuring a thickness of the ferromagnetic surface, and the locations of interest comprise locations whose measured thickness is below a critical value.

In an embodiment, the method further comprises: magnetically detaching the perched UAV from the ferromagnetic surface; flying the magnetically detached UAV away from the ferromagnetic surface; and detecting the marked locations of interest on the ferromagnetic surface from the magnetically detached UAV.

In an embodiment, the method further comprises: magnetically detaching the perched UAV with the re-docked crawler from the ferromagnetic surface; flying the magnetically detached UAV with the re-docked crawler away from the ferromagnetic surface to the pre-perching position; and flying the magnetically detached UAV with the re-docked crawler toward another pre-perching position in a vicinity of a second ferromagnetic surface to be inspected or maintained by the re-docked crawler.

In an embodiment, the method further comprises: magnetically detaching the perched UAV with the re-docked crawler from the ferromagnetic surface; and flying the magnetically detached UAV with the re-docked crawler away from the ferromagnetic surface to the initial position.

In an embodiment, autonomously perching the UAV comprises sensing the ferromagnetic surface using a depth camera or laser scanner of the UAV, and touching down on the ferromagnetic surface using the sensed depth camera or laser scanner data.

In an embodiment, autonomously perching the UAV further comprises: aligning the UAV at a pre-touchdown position using the sensed ferromagnetic surface data; and magnetically detaching the perched UAV with the re-docked crawler from the ferromagnetic surface; and flying the magnetically detached UAV with the re-docked crawler away from the ferromagnetic surface to the initial position.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 3A is a profile view of an example UAV having modular mounting points for attaching the undercarriage of FIGS. 2A and 2B, while FIGS. 3B and 3C are profile views of the UAV with the attached undercarriage at side and top orientations, respectively, with respect to the UAV, according to an embodiment.

FIGS. 4A, 4B, and 4C are profile views of an example UAV having rotatable mounting points for attaching the undercarriage of FIGS. 2A through 3C, together with the attached undercarriage at bottom, top, and side orientations, respectively, with respect to the UAV, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figure 1A:
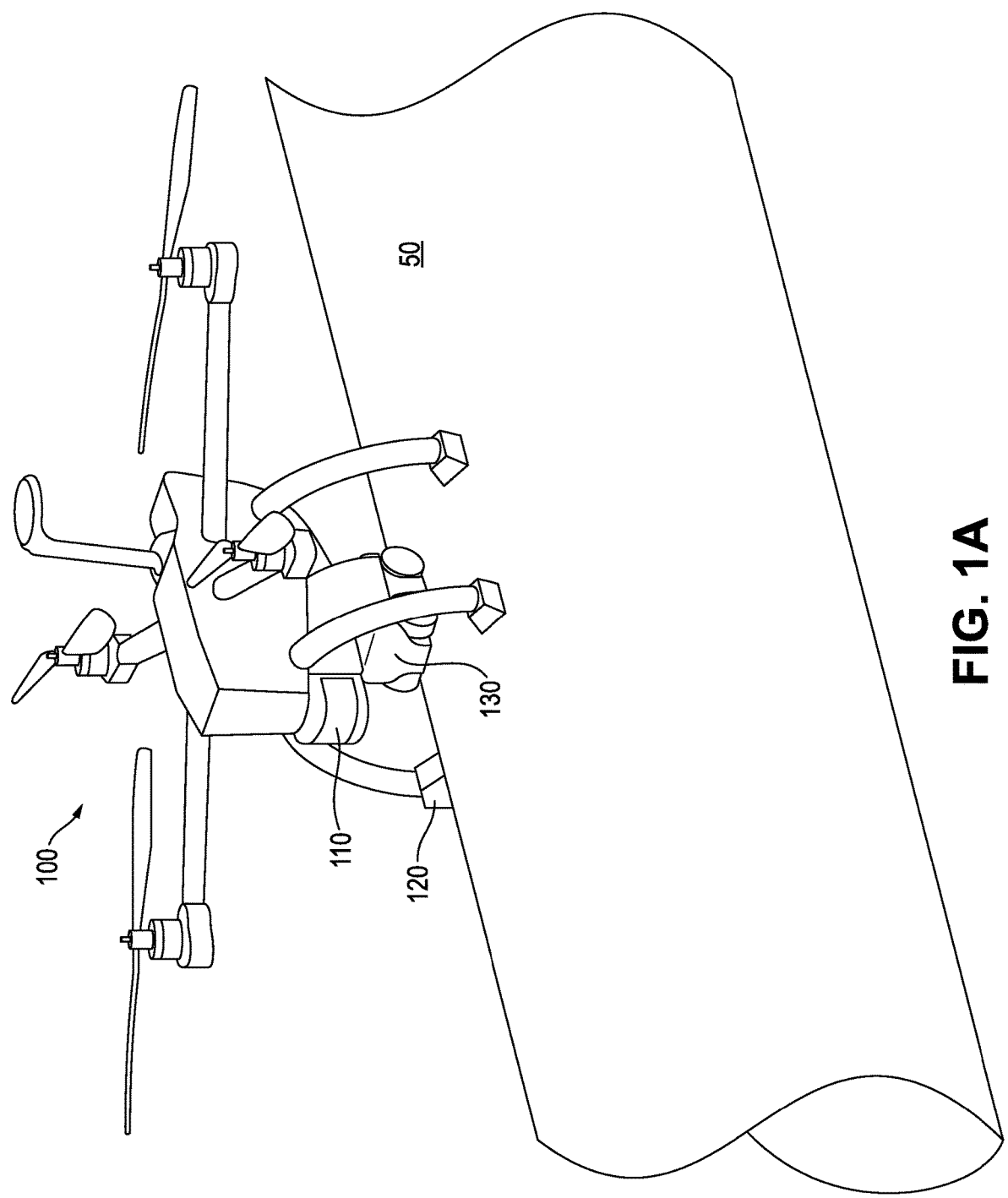
FIGS. 1A and 1B are illustrations of an example UAV perching on a structure (for example, a pipe), with the UAV having a releasable crawler for inspecting or maintaining the structure, according to an embodiment. The crawler is shown attached to the UAV in FIG. 1A and not attached to the UAV (e.g., crawling on the structure) in FIG. 1B.

In various example embodiments, a perching UAV having a releasable crawler for inspecting or maintaining a structure, such as an elevated or otherwise difficult-to-access pipe or storage tank, is provided. The UAV is a hybrid UAV that has advanced capabilities to perform contact inspection jobs on curved ferromagnetic surfaces such as carbon steel pipes, storage tanks, and other structures. The UAV can fly towards a pipe to be inspected, land on it autonomously (commonly referred to as perching), and deploy a releasable magnetic crawler to crawl around the pipe to perform, for example, elaborate inspection jobs at any angle of orientation. The crawler may also be configured to perform maintenance on the pipe. As will be appreciated from the following discussion, the UAV can land, for example, on top of, along the side of, or underneath a pipe or other structure, and in each instance is said to have landed on the structure.

As discussed earlier, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Sometimes the only way for people to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards.

Accordingly, in example embodiments, a perching UAV having a releasable crawler provides a solution to the aforementioned technical problems by having two vehicles in a mother/child configuration. Each vehicle is designed or optimized to perform the capabilities for which it is best suited. The vehicles include a perching UAV capable of flying and landing on a pipe, and a smaller magnetic crawler that is carried by and released from the UAV after landing or perching. The crawler can rove on the pipe and perform, for example, inspection scans such as thickness measurements using a UT sensor. For example, in some embodiments, both the UAV and the crawler attach magnetically to the curved surface of the pipe or other asset being inspected or maintained. As such, the crawler can perform complete longitudinal or circumferential scans of the asset (even upside down with respect to gravity).

This provides for a more feasible approach than having the whole UAV crawl around the pipe, which requires larger and heavier motors and risks collisions with nearby pipes and assets, especially with limited clearance constraints. The perched UAV also saves energy (e.g., electrical energy, battery energy) by being perched on the pipe (such as on top of the pipe) as opposed to hovering near the pipe. Perching the UAV on the surface of the pipe also allows the releasable crawler to release from or re-dock with the UAV more easily than when the UAV hovers next to the pipe. In addition, perching provides more stability and reduces risks compared to hovering.

Figure 1B:
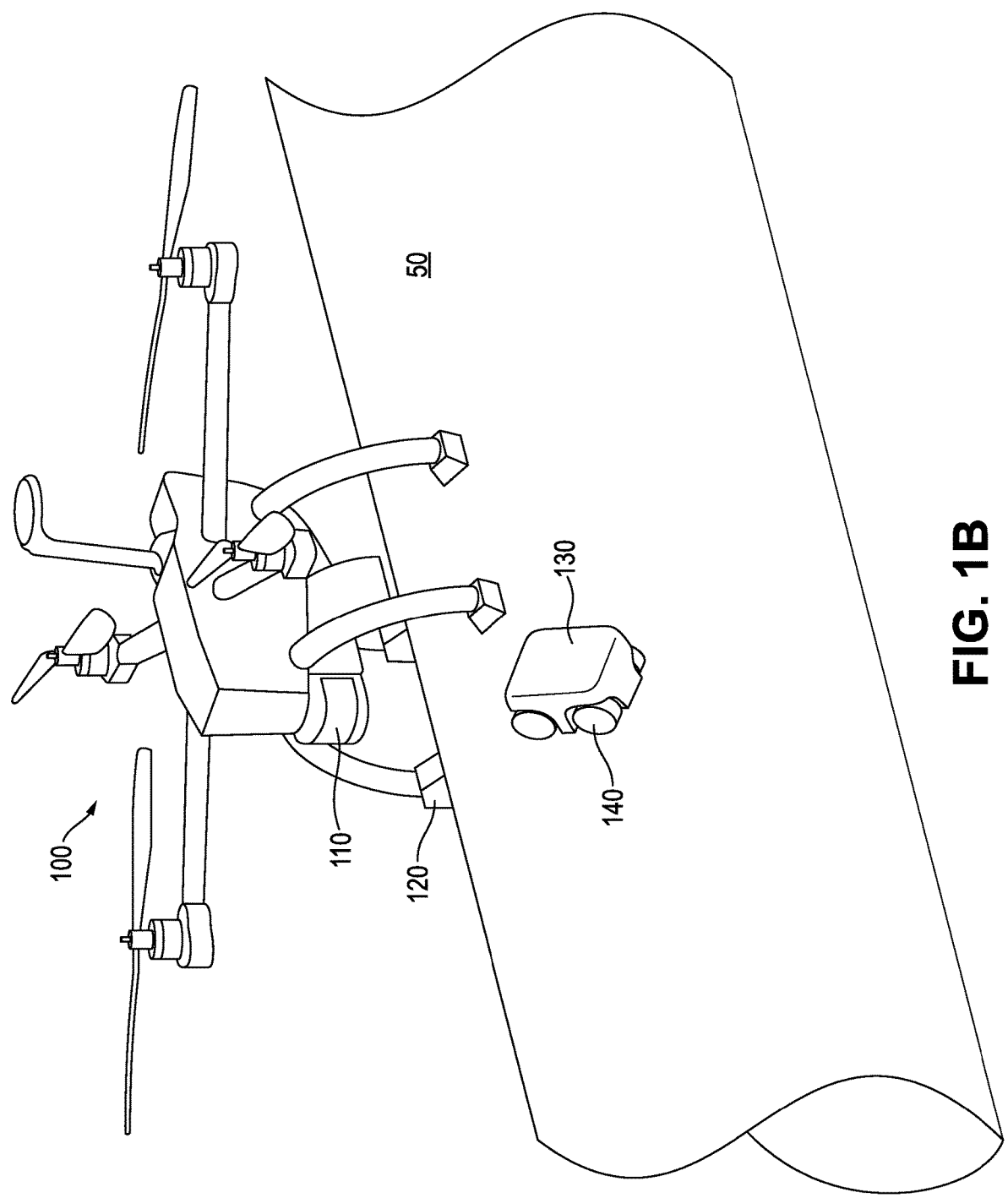

FIGS. 1A and 1B are illustrations of an example UAV 100 perching on a structure 50 (for example, a pipe), with the UAV 100 having a releasable crawler 130 for inspecting or maintaining the structure 50, according to an embodiment. The crawler 130 is shown attached to the UAV 100 in FIG. 1A and not attached to the UAV 100 (e.g., crawling on the structure 50) in FIG. 1B. For ease of description, it is assumed throughout that the structure 50 is larger (such as significantly larger) than the UAV 100. For example, the structure 50 is larger in every dimension than the UAV 100, or the structure 50 presents a larger footprint on which to land than the footprint of the UAV 100. In addition, it is assumed for ease of description that the structure 50 (or any structure described herein) is a pipe, such as an eight inch or larger diameter pipe.

FIGS. 1A and 1B show the mother-child configuration in action. FIG. 1A shows the UAV 100 after landing on the pipe 50 with the crawler 130 still docked in it. FIG. 1B shows the crawler 130 after being released from the UAV 100 to perform the inspection job. The crawling capability provided by the releasable crawler 130 gives the UAV 100 important features for inspection and maintenance jobs, such as easier accessibility (e.g., landing does not have to be on the exact spot where inspection or maintenance takes place). The crawling further provides for circumferential and longitudinal scans. For instance, in the oil and gas industry, it is important to perform full scans of the pipe 50 to find the minimum steel thickness on a certain area of the pipe 50. Such scans often include circumferential scans and longitudinal scans, for which crawling is well suited. The crawling further provides for power efficiency during multiple inspections (e.g., crawling between multiple inspection sites on the same pipe is more power efficient than flying).

Figure 2A:
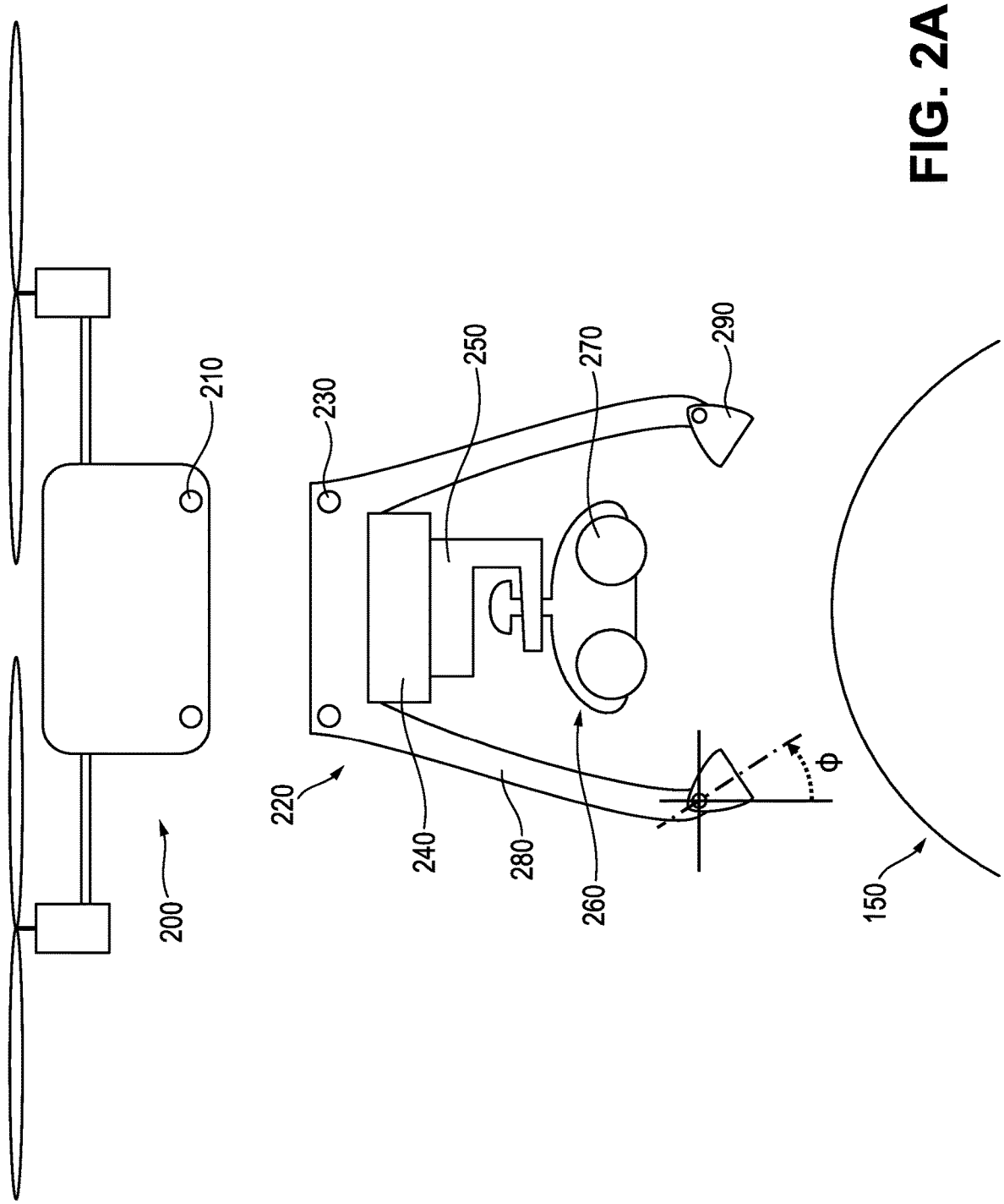
FIGS. 2A and 2B are exploded and profile views, respectively, of an example UAV or drone configured with an undercarriage having (1) perching legs for perching on a structure and (2) a crawler for releasing from the perched UAV on the structure to inspect or maintain the structure, according to an embodiment.
Figure 2B:
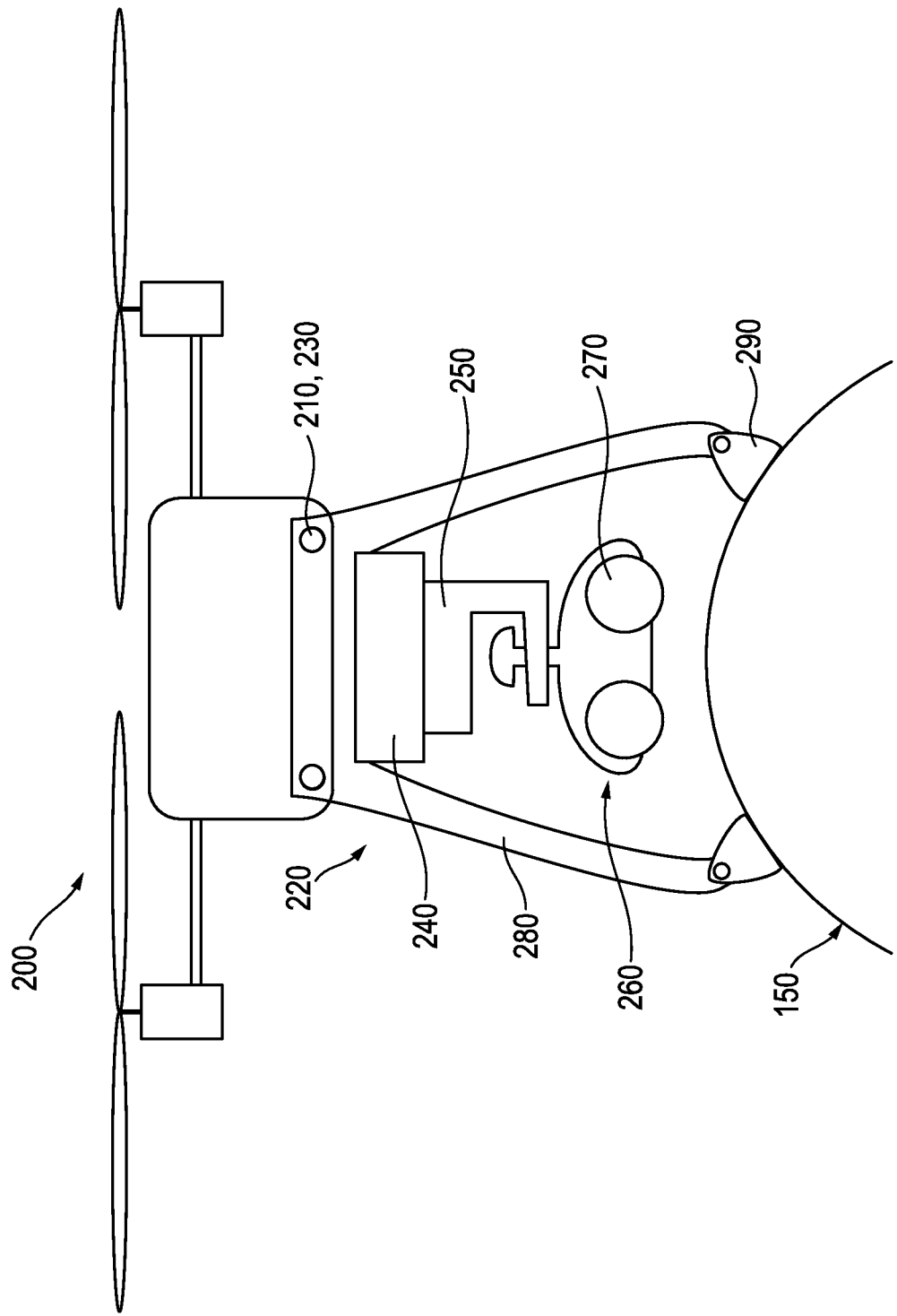

In FIGS. 1A and 2B, the UAV 100 utilizes four articulated magnets 120 (such as permanent magnets or switchable permanent magnets). To accommodate the landing of the UAV 100 on the pipe 50, each of the magnets 120 (or more precisely, its magnetic field) articulates with a perpendicular orientation with respect to the pipe 50 when the UAV 100 has landed or is perching on the pipe 50.

In some embodiments, the magnetic fields of the articulated magnets 120 are actively switchable on and off (e.g., to allow for easy detachment after job completion). A laser scanner 110 (e.g., light detection and ranging, or LIDAR) is included in order to measure, for example, the pipe's relative location with respect to the UAV 100 during the automated landing maneuver as a form of real-time feedback. In some embodiments, the miniature crawler 130 is connected by a wire (e.g., for power and communication) and includes a UT sensor, four magnetic wheels 140, and two motors to drive the wheels 140 in corresponding pairs (e.g., front and rear). The wire also allows the rest of the electronics and batteries for carrying out the inspection or maintenance to be located in the main UAV body 100. This reduces the size, weight, and complexity of the crawler 130.

In some other embodiments, the crawler 130 includes a different number of wheels 140 (e.g., two or three wheels, or more than four) and their type (e.g., omniwheels, mecanum wheels, to name a few). Unlike an unmanned ground vehicle (UGV), the magnetic crawler 130 has to contend with various curvatures and various directions (as illustrated throughout) of pipe inspection or maintenance. As such, in some embodiments, the magnetic crawler 130 has special locomotion systems to navigate pipe curvatures (or similar curvatures from other curved structures or vessels).

In some embodiments, communication between the crawler 130 and the UAV 100 is wired. For example, using a small spool of a thin cord, the crawler 130 can be connected to the UAV 100 for power and communication. This can eliminate, for example, the need to host a battery and other electronics inside the crawler 130, making it smaller and saving total weight by utilizing some of the components already existing in the UAV 100.

In some other embodiments, communication between the crawler 130 and the UAV 100 is wireless. Here, the crawler 130 includes its own battery and electronics, to provide for a more standalone vehicle. This can be useful, for example, when the UAV 100 picks up the crawler 130 from the ground and deploys it on the pipe 50, at which point the UAV 100 can fly to do some other inspection jobs and then go back to pick the crawler 130 up. This can also be useful for numerous crawlers 130 (e.g., a swarm of crawlers 130) to inspect multiple assets, with the UAV 100 working on picking them up one-by-one or in batches from the ground towards their destination and retrieving them upon job completion. In different embodiments, the wireless connection can be between the crawler(s) 130 and either the UAV 100 or an operator's control station, or both the UAV 100 and the operator's control station.

In an embodiment, the UAV 100 includes a body constructed to enable the UAV 100 to fly (e.g., having rotors, control and guidance devices, and the like). The UAV 100 also includes three or more legs connected to the body and configured to land and perch the flying UAV 100 on a curved ferromagnetic surface 50. Each leg includes a top (or main) portion connected to the body, and a bottom portion that includes a permanent magnet 120. The bottom portion is configured to magnetically attach the leg to the ferromagnetic surface 50 during the landing and to maintain the magnetic attachment of the leg to the ferromagnetic surface during the perching. In addition, a passive articulation joint connects the top and bottom portions of the leg, and passively articulates (e.g., pivots) the bottom portion with respect to the top portion in response to the bottom portion approaching the ferromagnetic surface 50 during the landing. The UAV 100 further includes a releasable crawler 130 having magnetic wheels 140. The magnetic wheels 140 allow the crawler 130 to detach from the UAV 100 during the perching, and to maneuver the crawler 130 on the ferromagnetic surface 50 while magnetically attaching the crawler 130 to the ferromagnetic surface 50 after the detaching.

In different embodiments, different landing mechanisms of the UAV 100 can be used. These can include different types of adhesion mechanisms such as magnetic or non-magnetic. Examples of magnetic landing mechanisms include magnets that can be shut-off or overcome by a mechanical means during takeoff from the pipe 50. Such magnets include switchable permanent magnets, permanent magnets with an actuated leverage to aid in detachment during takeoff, electro-permanent magnets, and electromagnets. It should be noted, however, that continuous power consumption can be a disadvantage for electromagnets. Non-magnetic adhesion mechanisms can be used for non-ferromagnetic surfaces such as stainless steel, composite pipes, and concrete walls. Such mechanisms include microspines, dry gecko-inspired adhesives (e.g., synthetic setae), suction cups, grippers, and claws.

In different embodiments, different crawler payloads or designs are used. For simplicity, these payloads or designs fall into two basic categories: inspection and maintenance. Inspection payloads and designs include a range of different types of sensors that are often used in the oil and gas industry to inspect pipes and structures. For example, in some embodiments, a UT sensor is used for thickness measurement. For ease of description, a UT sensor for thickness measurement is used throughout at times to represent an example device and application for inspection and maintenance. However, other embodiments are not limited to such a device or application. For instance, other inspection sensors or probes can be used instead of or in addition to the UT sensor depending on the job, including (but not limited to) eddy current sensors and alternating current field measurement (ACFM) sensors.

In still other embodiments, the crawler 130 is configured with one or more tools and used for maintenance purposes. For example: the crawler 130 can be used to perform light maintenance jobs such as cleaning, surface preparation, and coating repairs. In still other embodiments, the crawler 130 is configured with one or more cameras and used for visual inspection. For instance, in some embodiments, a camera is used for simple visual inspection jobs, such as where only videos or photos of areas of interest need to be obtained, but for which the areas are difficult to inspect directly by the UAV 100.

In some embodiments, the crawler 130 is configured to leave markers (such as paint or QR codes) behind on areas of interest (such as locations where the sensor readings are outside of normal levels, or where faults are detected). These locations, for example, can be where critical thickness levels are detected. In some such embodiments, after the crawler 130 re-docks and the UAV 100 flies away, the UAV 100 scans these markers and creates a 3D reconstruction of the environment showing the exact location of these markers. In some such embodiments, the UAV 100 uses an on-board RGB-D camera to detect the markers and compute their locations with respect to the UAV 100. Using the UAV's GPS position, absolute locations of the markers can be computed or otherwise determined. It should be noted that while the UAV 100 is scanning the markers, the crawler 130 can, for example, stay on the pipe 50 or be re-docked with the UAV 100.

In some embodiments, the crawler 130 uses wireless localization to identify problem locations on the asset, such as with virtual markers. In other words, the locations of faults can be determined even without physical markers, albeit with less precision. This is because the crawler's location with respect to the UAV 100 can be computed (or otherwise determined) using wireless sensors. For example, in some such embodiments, the UAV 100 carries an ultra-wide band (UWB) sensor array that receives wireless signals for another UWB transmitter that is mounted on the crawler 130. The crawler's relative location can then be measured regardless of whether the UAV 100 is in flight or attached to the pipe 50. In some embodiments, whenever an operator finds a fault while crawling, the crawler location with respect to the UAV 100 is tagged and captured. With the UAV's GPS sensor, the absolute positions of these faults can be determined. In some embodiments, when GPS is not available, the UAV's location is estimated based on the flight trajectory and IMU data from its home base, where GPS is available.

In some embodiments, previously computed (or determined) inspection locations are transferred from the UAV 100 to an operator computer, or a ground station. Then, the inspection locations are visualized on, for example, a previously-built 3D model of the inspected plant, or a 3D model that can be constructed from the UAV's onboard sensors, e.g., depth camera or 3D LIDAR. In addition, in some such embodiments, the visualized locations are annotated with the corresponding measured thicknesses (or other sensed values or information).

FIGS. 2A and 2B are exploded and profile views, respectively, of an example UAV 200 or drone configured with an undercarriage 220 having (1) perching legs 280 for perching on a structure 150 (such as a carbon steel pipe or other curved ferromagnetic surface 150) and (2) a crawler 260 for releasing from the perched UAV 200 on the structure 150 to inspect or maintain the structure 150, according to an embodiment. The crawler 260 has magnetic wheels 270 for maneuvering on while adhering to the curved ferromagnetic surface 150 (e.g., regardless of orientation with respect to gravity, even upside down). For ease of description, a pipe is used throughout as an example structure having a curved ferromagnetic surface. However, the described embodiments are equally applicable to other such structures, such as cylindrical or spherical storage tanks, having curved ferromagnetic surfaces. The UAV 200 or drone can include rotors (such as four or six rotors) and a control unit for adjusting the rotation speeds of the individual rotors to balance the load of the UAV 200 or cause the UAV 200 to move in a desired direction.

Referring to FIGS. 2A and 2B, the UAV 200 includes a set of mounting points 210 for mating with a similar set of mounting points 230 of the undercarriage 220. In this fashion, any compatible UAV/undercarriage combination (e.g., compatible mounting points and payload capacities/weights) can be assembled for a desired purpose, in this case a releasable crawler 260 for deploying on the structure 150 and inspecting or maintaining the structure 150. To this end, the undercarriage 220 includes a set of perching legs 280 (e.g., four such legs 280), each with an articulated magnet 290. The articulated magnets 290 are mounted to the legs 280 so as to permit for orienting towards and adhering to the curved ferromagnetic surface 150 when the UAV 200 approaches and perches on the surface 150.

Thus, as shown in FIG. 2A, the articulation joint enables pivoting, which can be in multiple axes such as when the joint comprises a universal joint, of the magnet 290 in its housing relative to the surface 150 to which the leg 280 is about to perch. The pivoting can be around an axis of the leg 280 or joint, as shown, to assume an angle φ relative to the axis, and optionally relative to additional angles θ, etc. The UAV 200 and undercarriage 220 are configured primarily to perch and deploy/retrieve the crawler 260 to or from the top (or near the top) of a structure (e.g., to keep the rotors of the UAV 200 reasonably level before, during, and after perching).

In addition, the undercarriage 220 includes a height adjustment mechanism 240 (for example, a motor or other actuator) for lowering the crawler 260 from the perched UAV 200 to the surface 150 or for raising the crawler 260 from the surface 150 to the perched UAV 200. To assist with this, a docking mechanism 250 connects the height adjustment mechanism 240 to the crawler 260, such as with a docking port. The docking port allows the crawler 260 to disengage (e.g., drive away from) the perched UAV 200 once deployed on the surface 150 or to engage (e.g., drive into or onto) the perched UAV 200 when ready to leave the surface 150, such as to return to a home base or other structure or component to be inspected or maintained. The docking mechanism 250 may also allow for information or energy transfer between the UAV 200 and the crawler 260, such as to download instrumentation data from the crawler 260 to the UAV 200 or to recharge a battery of the crawler 260 from the UAV 200.

In further detail, in some embodiments, the height adjustment mechanism 240 is used to adjust the height of the crawler 260 based on the pipe diameter (e.g., to ensure successful release on the surface 150). For instance, on large pipes (or flat surfaces), the height of the docked crawler 260 to the surface 150 is greater than when on small diameter pipes. As such, for large pipes (or flat surfaces), the crawler 260 is deployed to a lower height to reach the surface 150 whereas on a small diameter pipe, the crawler 260 is deployed and released at a higher point. In addition, is some embodiments, the height adjustment mechanism 240 is used to re-dock the crawler 260 after job completion. This allows the docking mechanism 250 to be at the correct height with respect to the crawler 260. Again, different pipe diameters can have corresponding different heights. In some embodiments, the height adjustment mechanism 240 is used to pull the crawler 260 and break its magnetic attachment to the ferromagnetic surface 150.

In some embodiments, the height adjustment mechanism 240 is actuated, such as with a motor. In some embodiments, the height adjustment mechanism 240 is passive when it is not used to detach the crawler 260. For example, in one such embodiment, the height adjustment mechanism 240 is spring-loaded so that it can always be at maximum possible extension to press against the pipe 150 when the UAV 200 is perched and deploying the crawler 260.

In the UAV 200 with undercarriage 220, approaching and landing close to the top of the pipe 150 (e.g., 12 o'clock or near 12 o'clock position) with a straight or near straight angle is desirable, and usually provides for adhesion and proper perching of the legs 280. The perching legs 280 have features useful for successful perching and adhesion to the pipe 150. For instance, each leg 280 in the perching mechanism features an articulated magnet 290 (such as a permanent magnet or a switchable permanent magnet). The articulation of the leg 280 is passive in that the articulated magnet 290 is designed to articulate about the axes shown in FIG. 2A in response to the magnetic attraction of the magnet 290 and the ferromagnetic surface 150 when the UAV 200 (or more precisely, the attached undercarriage 220) is in close proximity to the target ferromagnetic surface 150, such as in response to initial contact between the two. It should be noted that the undercarriage 220 can be mounted on any UAV with the suitable mounting points (e.g., to mate with mounting points 230) and payload capacity (e.g., to carry and deploy the undercarriage 220 in flight).

In some embodiments, after deployment and job completion, the crawler 260 re-docks with the UAV 200, or more specifically, with the docking mechanism 250. The process of re-docking and takeoff from the ferromagnetic surface 150 by the UAV 200 with the crawler 260 also involves magnetically detaching the crawler 260 from the surface 150. In some such embodiments, the UAV 200 uses the height adjustment mechanism 240 to pry the crawler 260 away from the magnetic attraction of the magnetic wheels 270 of the crawler 260 and the ferromagnetic surface 150. In some other such embodiments, the magnetic wheels 270 use switchable magnets to disable adhesion to the ferromagnetic surface 150 after re-docking. In still some other such embodiments, the docking mechanism 250 includes a ramp that lies on the pipe 150 and is attached to the UAV 200. In such embodiments, the crawler 260 climbs the ramp while re-docking (such as parking onto an inclined driveway). In this way, the crawler's wheel motors are used to force the magnets of the magnetic wheels 270 to detach using the driving torque of the crawler 260. The ramp can be made of a metallic material (e.g., steel) or a non-magnetic material, depending on factors such as weight, strength, and the like. In each such embodiment, magnetic attachment of the UAV 200 is achieved to enable the UAV 200 to fly to a next location together with the crawler 260 as a payload securely retained by the UAV 200.

Figure 3C:
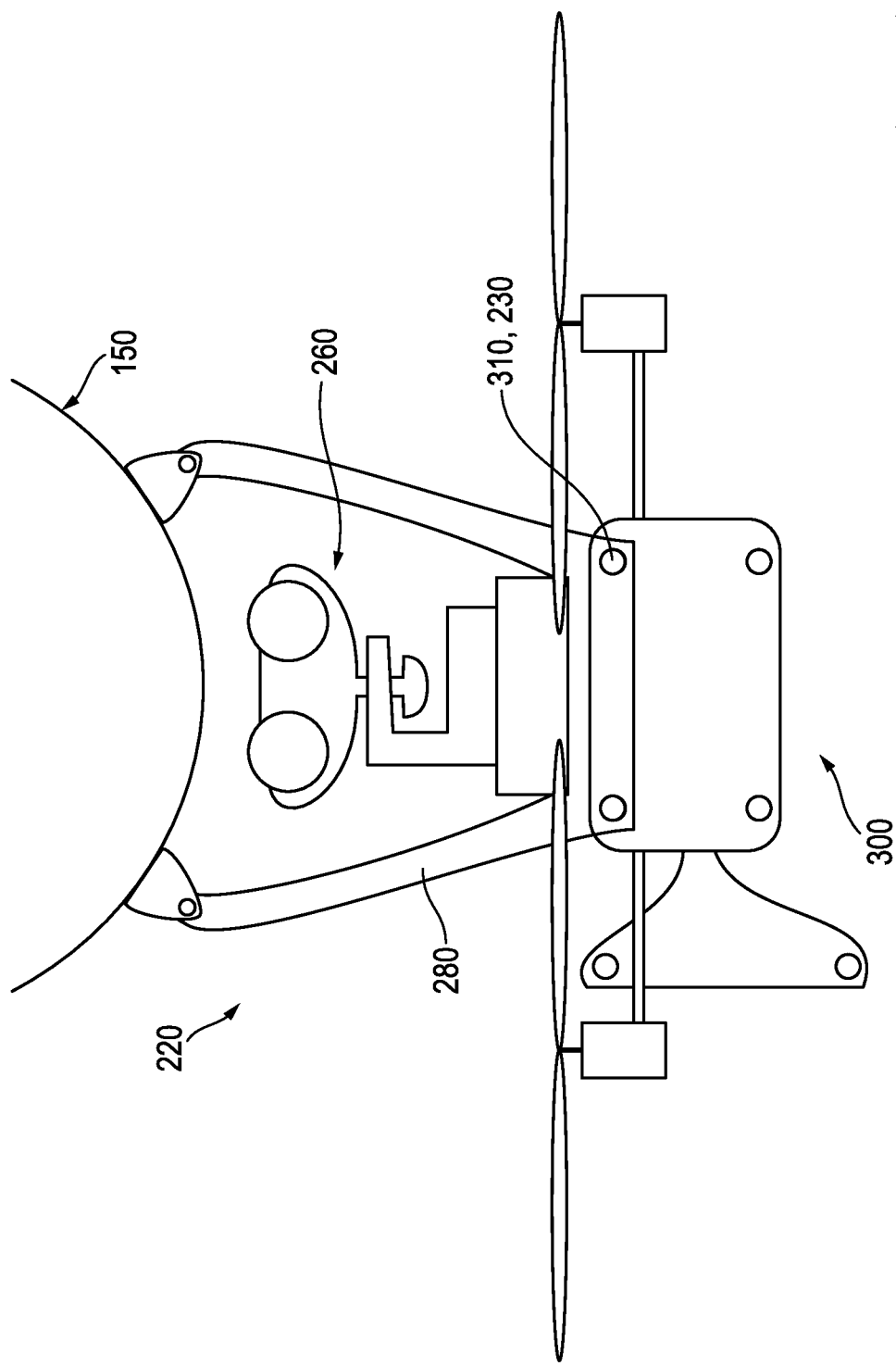

FIG. 3A is a profile view of an example UAV 300 having modular mounting points 310 for attaching the undercarriage 220 of FIGS. 2A and 2B, while FIGS. 3B and 3C are profile views of the UAV 300 with the attached undercarriage 220 at side and top orientations, respectively, with respect to the UAV 300, according to an embodiment. This modular approach allows for mounting the undercarriage 220 (payload) on, for example, the bottom, front, or top of the UAV 300 in order to allow for perching on the top, side, or bottom, respectively, of the pipe 150.

One of the biggest challenges in inspecting pipes in refineries is that many of the pipes are not accessible from the top because of obstacles such as racks, structures, and other pipes. In these cases, accessing or perching on such surfaces from other positions, such as from the side or bottom of the structure, is desirable. The UAV 300, together with the undercarriage 220 attached to a suitable set of mounting points 310, can perch on the top, side, or bottom of the pipe 150 using adaptable perching legs 280, as illustrated in FIGS. 3A, 3B, and 3C, respectively.

In further detail, each leg 280 is designed with an articulated magnet 290 that breaks the leg 200 into two distinct parts, a main body rigidly mounted to the undercarriage 220 and a moving (or articulating) magnet 290. This provides the leg 280 with at least a rotational degree of freedom, which allow the magnets 290 to passively realign their orientation (e.g., perpendicular) toward the pipe 150 during landing for perfect or near perfect adhesion.

It should be noted that for ease of 2D side view illustration, features like the rotors of the UAV 300 are sometimes shown as contacting other parts of the UAV 300 (such as the perching legs 280). However, this is because the depth dimension (in which such features would not overlap) is not illustrated. The rotors of the UAV 300 do not obstruct the undercarriage 220 in any configured orientation of the undercarriage 220 (e.g., the undercarriage 220 is between the rotors when viewed from above).

Figure 4C:
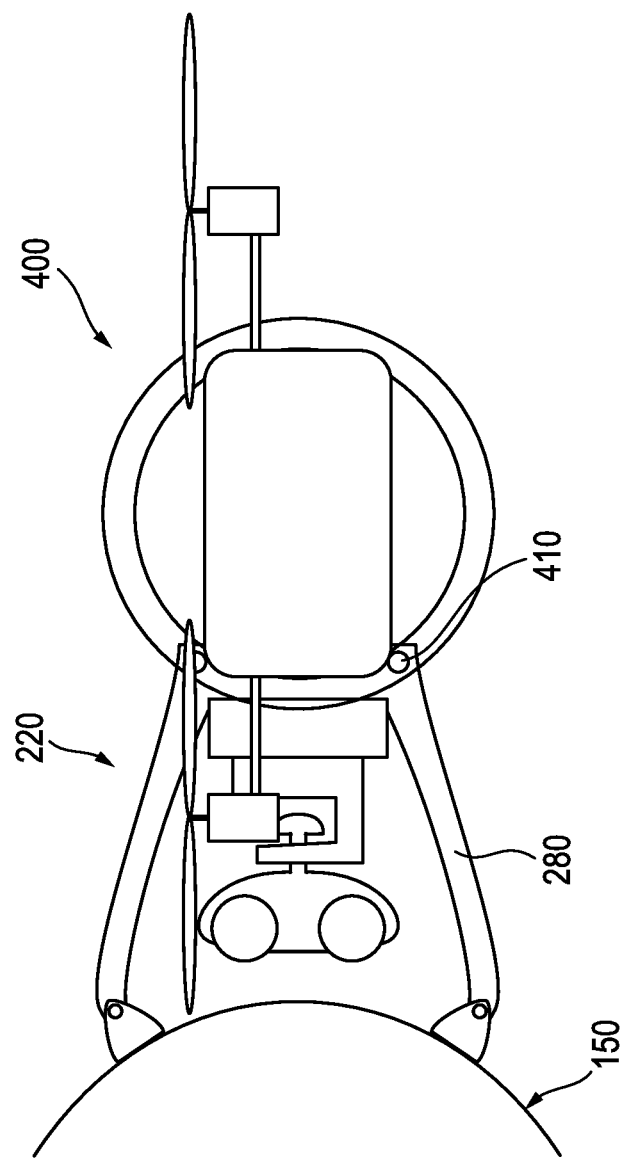

It should also be pointed out that changing the location of the undercarriage 220 does change the center of mass for the UAV 300. As such, the UAV 300 has to compensate for this change. In some embodiments, an onboard flight controller for the UAV 300 is configured (e.g., by logic, code, or the like) to keep the UAV 300 in a stable hover regardless of weight distribution. For example, if the UAV 300 becomes forward-heavy, then the controller is configured to sense the slightest tilt and compensate for that by increasing the thrust or rotation speeds (of the rotors) on the heavy side to keep the UAV 300 level and stable. In some embodiments (such as illustrated in FIGS. 4A to 4C), to reduce the effect of a changing center of mass, heavy components such as batteries are placed on a rotating rail in opposition to the undercarriage 220. This makes it easier for the flight controller to keep the UAV 200 stable during situations where the undercarriage 220 is not directly below the UAV 200.

FIGS. 4A, 4B, and 4C are profile views of an example UAV 400 having rotatable mounting points 410 for attaching the undercarriage 220 of FIGS. 2A through 3C, together with the attached undercarriage 220 at bottom, top, and side orientations, respectively, with respect to the UAV 400, according to an embodiment. In some embodiments, the UAV 400 includes a motor or actuator for rotating the mounting points 410 to a suitable orientation, including during flight (e.g., dynamic rotation). In some other embodiments, the mounting points 410 can be manually rotated to a desired orientation prior to a mission (e.g., static rotation).

In an example motorized embodiment, the motorized system (e.g., motorized mounting points 410 and motor to rotate the mounting points 410 circumferentially about the UAV 400) allows an operator to change the orientation of the undercarriage 220 (payload) with a press of a button. In another embodiment, the UAV 400 automatically changes the orientation of the undercarriage 220 (e.g., during flight) depending on factors such as the observed or otherwise known obstacles around the pipe 150. With these in mind, FIGS. 4A, 4B, and 4C illustrate how the motorized system changes orientation of the perching legs 280 to land on top, bottom, or side, respectively, of the pipe 150.

For example, in one embodiment, the UAV has a controller configured (such as by computer code) to plan which is the safest spot on the pipe 150 on which to perch, such as top, side, or bottom of the pipe 150, or somewhere in between. In the example motorized embodiment shown in FIGS. 4A through 4C, the rotation is achieved through a circular rail around the UAV's body 400. As such, to maintain a reasonable center of mass during rotation, heavy components such as batteries can be placed on the rail (e.g., at opposing positions to the mounting points 410) to serve as counter weights.

In an example user-adjustable (e.g., manual) embodiment, the rotation of the undercarriage 220 is manually adjusted by the user instead of being motorized. For instance, this can be done to save weight, complexity, power, or the like. An example technique for accomplishing this manual adjustment is by releasing hand screws to unlock manual rotation of undercarriage 220 about the circular rail, which can then be relocked once the undercarriage 220 is in the desired position.

Figure 5A:
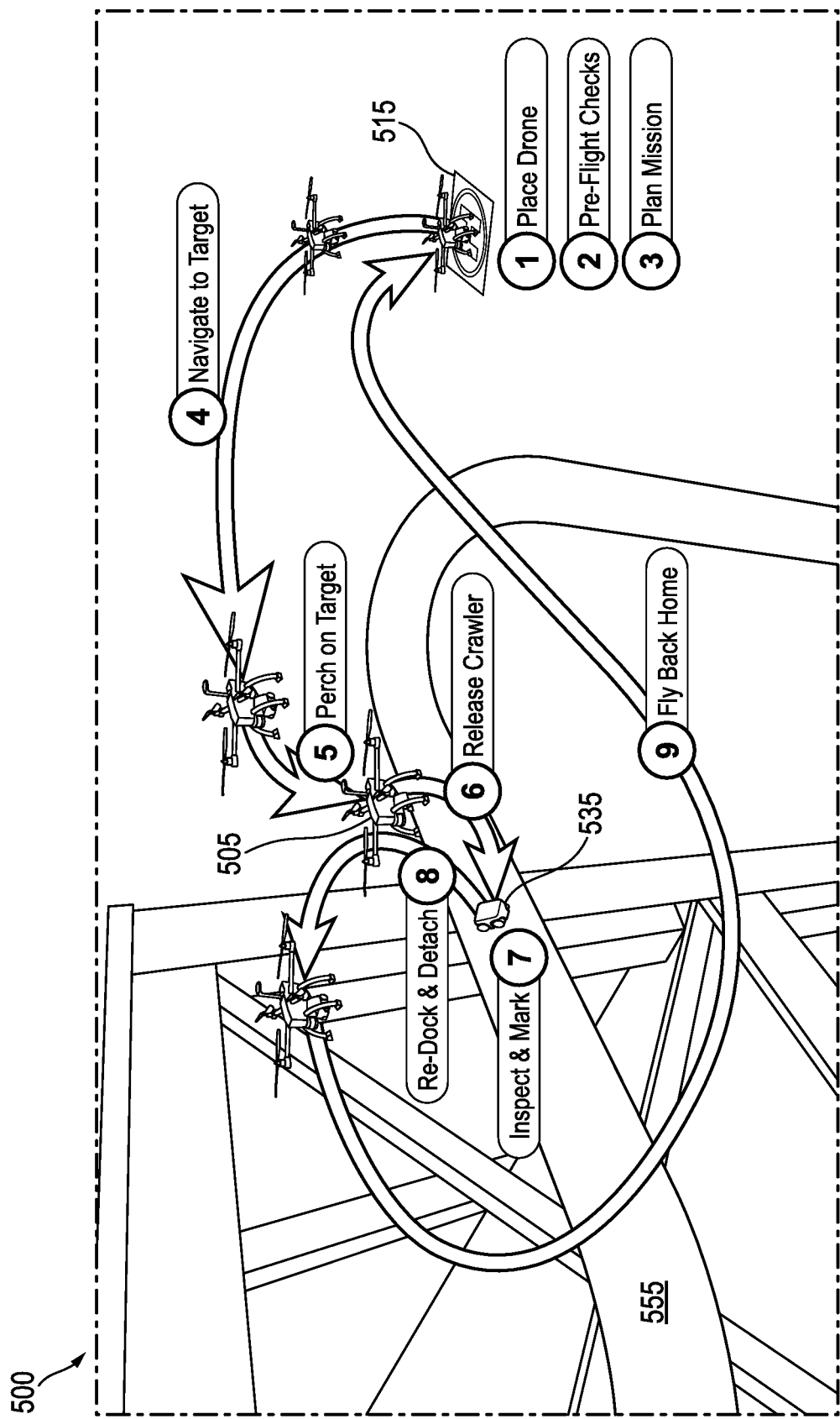
FIGS. 5A and 5B are an illustration and corresponding flow chart, respectively, of an example inspection method of a target structure (e.g., pipe) using a perching UAV with a releasable crawler, according to an embodiment.
Figure 5B:
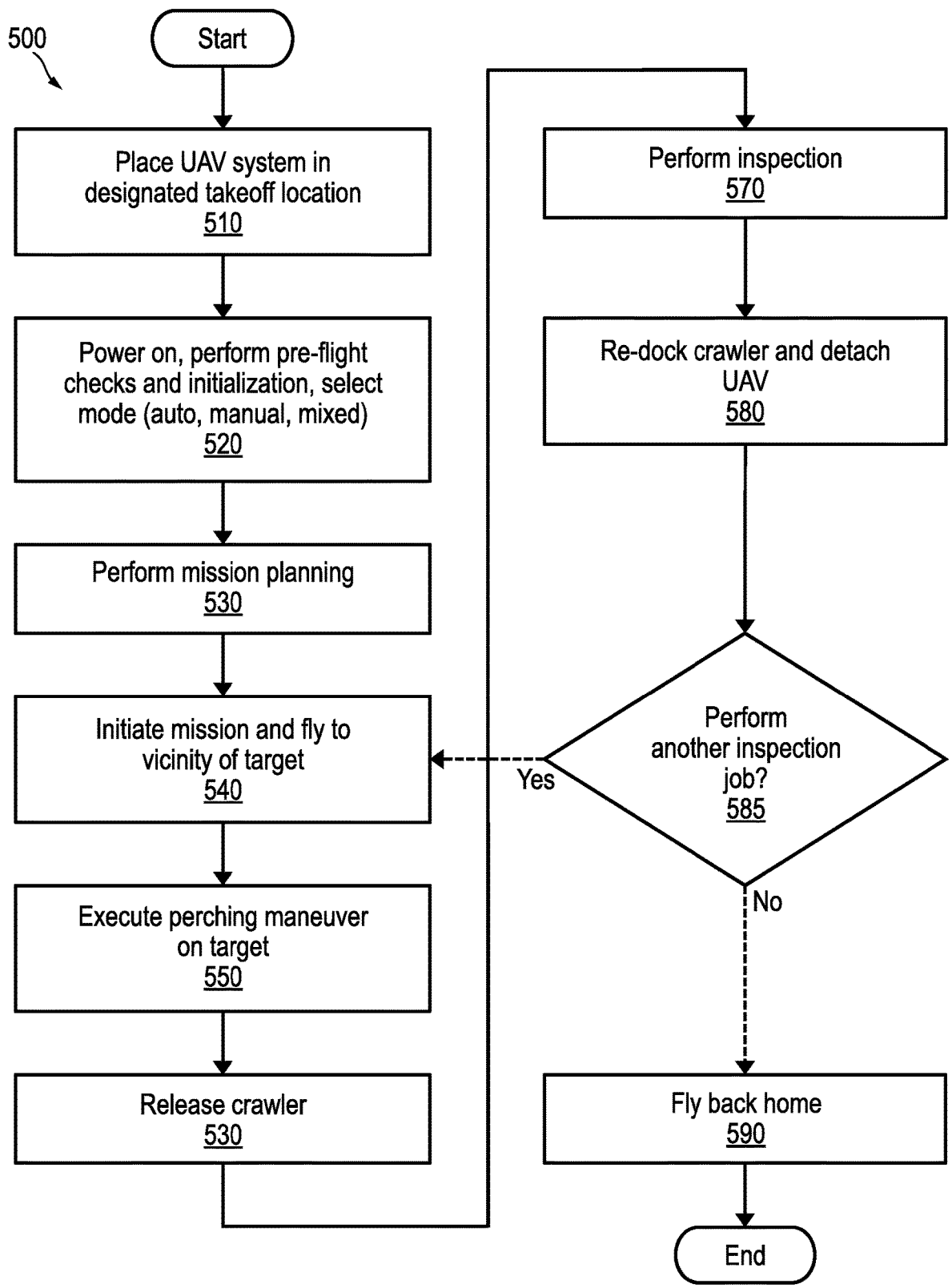

FIGS. 5A and 5B are an illustration and corresponding flow chart, respectively, of an example inspection method 500 of a target structure 555 (e.g., pipe) using a perching UAV 505 with a releasable crawler 535, according to an embodiment. FIG. 5A illustrates the method 500 pictorially, with illustrated steps 1 through 9 that correspond to steps 510 through 590, respectively, of the flow chart of FIG. 5B. For ease of description, the method 500 will be described with reference to steps 510 through 590 of FIG. 5B, but can also be visualized with corresponding reference to FIG. 5A at any point.

FIGS. 5A and 5B describe an inspection method 500 to inspect assets, such as those in the oil and gas industry including pipes, tanks, and other structures, using a perching UAV 505 with releasable crawler 535 system as described in example embodiments throughout. The system includes the UAV 505 that is used to carry the releasable crawler 535 to be deployed on elevated structures such as steel pipes (e.g., pipe 555) in order to perform, for example, contact inspection jobs. Using such a sophisticated system in critical industrial environments requires a high level of safety assurance and reliability of the system. As such, the method 500 systematically and safely performs the inspection job. In addition, the method 500 can be programmed or encoded in, for example, system software in order to automate the process 500 as much as possible.

The method 500 illustrates a multi-step mission to enable a successful and safe inspection of the target pipe 555. FIG. 5A depicts the method steps in an example sequential order. Some of the key steps including flying the UAV 505 either autonomously or manually to the vicinity of the inspection target 555 (referred to as a pre-perching waypoint). Once the target 555 is close enough and detectable by the sensors of the UAV 505, such as a depth camera or laser scanner (LIDAR), the operator initiates an autonomous landing onto the target 555 by either confirming the auto-detected target 555 or selecting a different target on the screen. The UAV 505 is programmed (or otherwise configured) to autonomously perform a perching maneuver (e.g., land on the target 555) so that it can safely approach the target 555 and attach itself to the target 555 autonomously.

After landing, a crawler 535 is released from the UAV 505. In one embodiment, the crawler 535 is driven manually by the operator on the target surface 555 to perform the inspection job. In another embodiment, the crawler 535 is programmed or otherwise configured to maneuver on the pipe 555 and perform the inspection (or maintenance) job autonomously. Upon completion, the crawler 535 is re-docked (e.g., by operator, or autonomously using pre-programmed code or logic) into the UAV 505, which is then flown to another inspection area or back home to the takeoff and landing location 515.

In further detail, and with further reference to FIG. 5B, the method 500 begins with the pre-flight stage, such as the step of placing 510 the UAV system 505 (or drone) in a designated takeoff (and landing) location 515. In one embodiment, an operator places the UAV 505 in the designated takeoff location 515 with the rotors (or propellers) removed. At this point, the method 500 includes the step of powering on 520 the UAV 505 and performing preflight checks and initialization. In an embodiment, an operator performs the checks and initialization. The mission should not proceed if any of the checks fails.

In example embodiments, the checks can include, but are not limited to: checking the battery health of the UAV 505, checking that the propulsion system works as expected, checking communications between the operator's control station and the UAV/crawler 505/535, checking the perching mechanism functionality, checking the functionality of the crawler 535 and its docking mechanism, checking and calibrating the inspection tools (e.g., UT sensor), installing the rotors or propellers on the UAV 505, setting the UAV 505 in position mode (e.g., in order to stabilize its position in the air), enabling obstacle avoidance mode (e.g., in order to enable the UAV 505 to navigate the environment safely during its autonomous mission through the waypoints), and selecting the flight guidance mode of the UAV 505 (e.g., to manual, autonomous, or mixed mode, where some waypoints are navigated autonomously and some waypoints are navigated manually).

The method 500 further includes the step of performing mission planning 530, which differs depending on factors such as the type of flight guidance mode. In one embodiment, autonomous guidance mode is selected (where the UAV 505 is programmed to fly autonomously to the different waypoints). Here, the operator defines waypoints and the associated actions (e.g., a takeoff waypoint at predefined altitude, a pre-perching waypoint at a predefined distance from the target 555, and failsafe waypoints in case unplanned events take place). In addition, in one embodiment, the mission planner provides estimates on the expected mission times. For example, this can be based on the estimated power consumption given the input mission plan by the operator (e.g., estimated time of flight to and from the target 555, estimated maximum time of the inspection operation, and the like).

In another embodiment, manual guidance mode is selected. Here, the operator plans a mission by visually identifying the best and safest path to fly from the take-off point 515 towards the vicinity of the inspection target 555. In addition, in one embodiment, the mission planner plans expected mission times to have enough battery life for a return to home 515. For example, the mission planner can set geofence limits that should not be exceeded during manual operation.

In yet another embodiment, mixed guidance mode is selected. This is similar to autonomous mode (where a mission is fully planned on the control station) but differs by allowing the operator to select some of the waypoints to be navigated manually (e.g., in case obstacles or a difficult environment lies ahead of the UAV 505 on the way to that waypoint). This is useful, for example, when the operator's confidence in automated flight is not high enough for a particular waypoint.

The method 500 further includes the step of initiating the flight mission and flying 540 the UAV 505 to the vicinity of the inspection target 555. In an example autonomous guidance mode embodiment, this includes commanding the UAV 505 to go to the takeoff waypoint, and commanding the UAV 505 to go to the pre-perching waypoint (e.g., in the vicinity of the inspection target 555). For example, in one embodiment, the UAV 505 is configured (e.g., programmed) to automatically transition from one mission waypoint to the next, while in another embodiment, the UAV 505 is configured to wait for operator confirmation each time it arrives at a waypoint before proceeding to the next. In an example manual guidance mode embodiment, this includes manually flying the UAV 505 to the vicinity of the inspection target 555 in preparation for perching. In an example mixed guidance mode embodiment, the step of initiating and flying 540 is similar to the autonomous mode, but the operator is alerted by the system to take over when the manual portions of the mission start.

The method 500 further includes the step of executing the perching 550 maneuvers. This includes defining the target of interest (e.g., using the operator's control station), with target detection and localization software configured (e.g., programmed) to use the defined target 555 to detect and localize the target 555 in order to plan for perching. Here, in one embodiment, the operator confirms object detection and issues the perching command.

In an example embodiment, the UAV 505 is programmed to autonomously perform the perching in two steps. In a first step, the UAV 505 autonomously approaches the target 555 at a pre-touchdown position where, in one embodiment, the operator confirms its accurate position before final touchdown, and (2) autonomously performs a final alignment using an onboard sensor (e.g., 2D LIDAR) that, in one embodiment, is also confirmed by the operator. In an example confirmation embodiment, if positioning and final alignment are not both confirmed, the UAV 505 is commanded to fall back to a failsafe waypoint (e.g., where perching can be re-executed), or a mission abort is safely commanded (to which the UAV 505 is configured to return home). In a second step, the UAV 505 waits for the pre-touchdown to be confirmed, at which point the UAV 505 is programmed to touch down autonomously while the perching mechanism is configured to provide a confirmation of perching completion. If confirmation of perching completion is not indicated, the UAV 505 goes to a failsafe waypoint, where perching can be re-executed, or a mission abort is commanded (and the UAV 505 returns home).

The method 500 further includes the step of releasing 560 the crawler 535. In one embodiment, upon successful perching, the operator commands crawler release. Once the crawler 535 is deployed on the target 555, and a confirmation is indicated by the system, the operator starts the inspection step. The method 500 further includes the step of inspecting 570 the target 555. In one embodiment, the operator controls the crawler 535 to perform the inspection job on the target 555. In an embodiment, the crawler 535 is operated via a cable that is connected to the UAV 505. In another embodiment, the crawler 535 is operated through a wireless connection, and the crawler motion is constrained within a predefined safe region of communication.

In an embodiment, the UAV system 505 is programmed or otherwise configured to monitor the overall status and provide estimates on the maximum allowed inspection time depending on, for example, the available power. In addition, the UAV system 505 is further programmed to store inspection data (e.g., from the UAV 505, or from the crawler 535, or from the UAV 505 as obtained by the crawler 535) continuously on the system memory, and to transfer the stored inspection data to the operator control and monitoring station in real time.

The method 500 further includes the step of crawler re-docking 580 and UAV detachment. In an embodiment, once the inspection is completed, the crawler 535 is driven back to the UAV 505 by the operator and an autonomous re-docking command is issued. For example, the crawler 535 can be programmed or otherwise configured to perform an autonomous re-docking with the UAV 505. Once re-docking is confirmed, the UAV 505 transitions to the detachment state (e.g., detaches from the magnetic attraction of the target 555). In an embodiment, the operator commands the UAV 505 to go to the hover state, and the latching mechanism is disengaged. At this point, the operator commands the UAV 505 to go to a predefined failsafe waypoint in the vicinity of the target 555. From here, the method 500 further includes the step of deciding 585 whether to safely return the UAV 505 back to the takeoff and landing position 515, or to command the UAV 505 (with attached and re-docked crawler 535) to go to another inspection job target.

The method 500 further includes the step of flying 590 the UAV 505 back home (e.g., to the takeoff and landing position 515). In an embodiment, unless another inspection is commanded (e.g., in step 585), the UAV 505 goes to the landing position 515 at a predefined landing altitude after which it descends vertically to the ground. Once landing is confirmed, the rotors or propellers are disarmed, and the mission ends.

Figure 6:
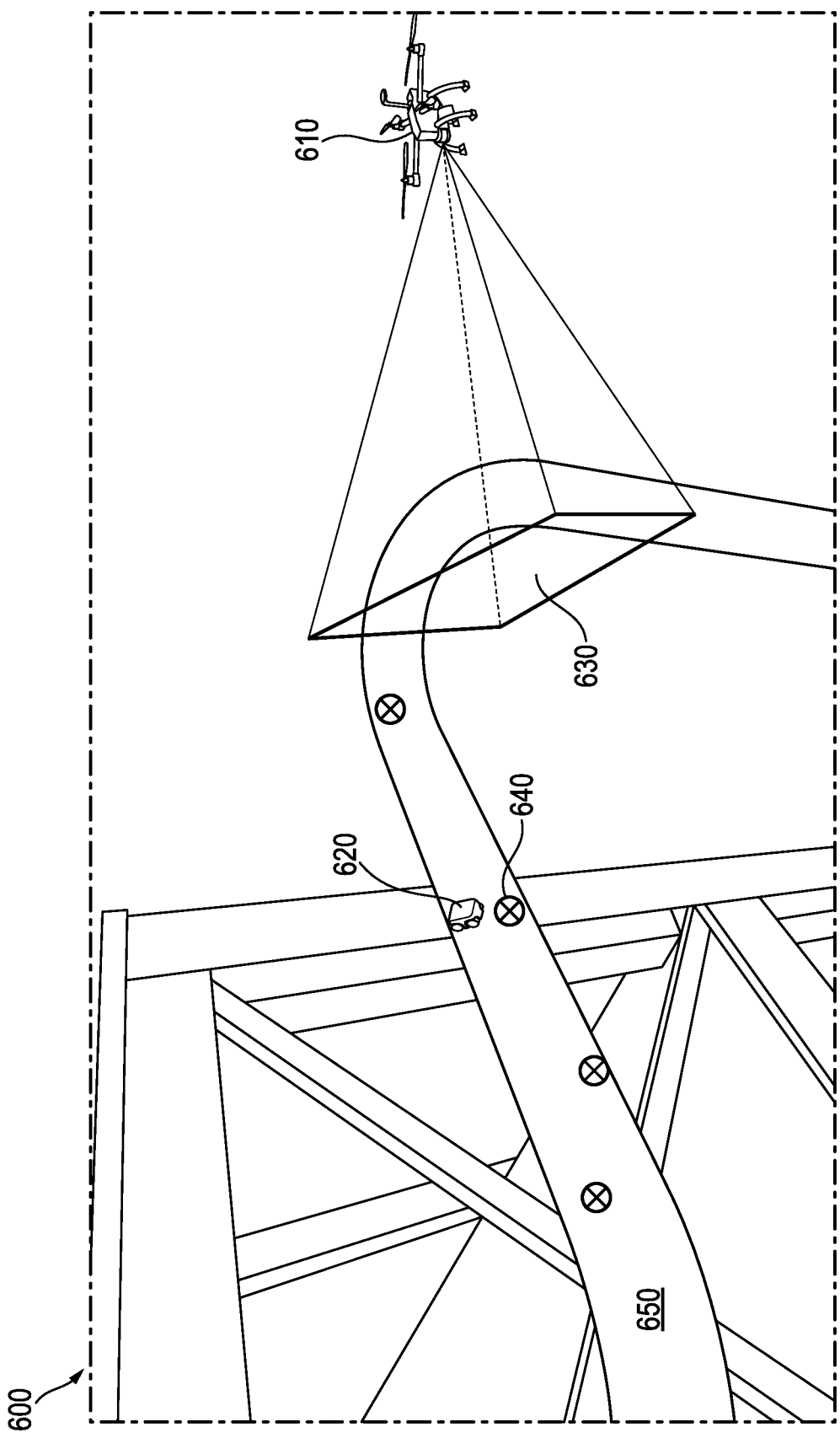
FIG. 6 is an illustration of an example releasable crawler visibly marking interesting (e.g., suspect) portions of a structure (e.g., pipe) encountered during inspection or maintenance of the structure, together with an example UAV detecting the visible markers left by the crawler, according to an embodiment.

FIG. 6 is an illustration of an example releasable crawler 620 visibly marking interesting (e.g., suspect) portions 640 of a structure (e.g., pipe 650) encountered during inspection or maintenance of the structure 650, together with an example UAV 610 detecting the visible markers 640 left by the crawler 620, according to an embodiment. In FIG. 6, the crawler 620 has marked numerous inspection points 640 (e.g., where sensor measurements were out of normal bounds) for identification by the UAV 610 (e.g., through camera view 630 as sensed by the UAV 610).

In further detail, the crawler 620 can be programmed to leave physical markers 640 (such as paint or QR codes) at inspected locations of the pipe 650 where faults (e.g., thickness levels below a critical threshold) are detected. The UAV 610 is programmed to use an on-board RGB-D camera (with view 630) to detect the markers 640 and compute (or otherwise determine) their locations with respect to the UAV 610. Using the UAV's GPS position, the UAV 610 is further programmed to compute (or otherwise determine) absolute locations of the markers 640 from these detections. In an embodiment, while the UAV 610 is scanning the markers 640, the crawler 620 stays on the pipe 650. In another embodiment, the crawler 620 is docked into the UAV 610 while the UAV 610 scans the markers 640.

Figure 7A:
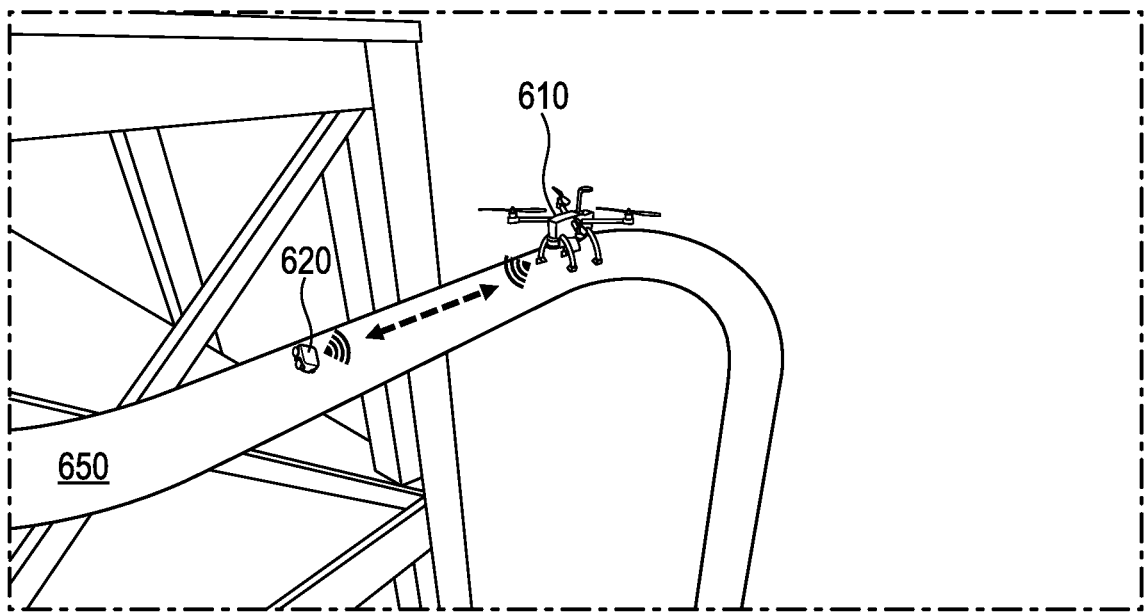
FIGS. 7A and 7B are illustrations of example techniques for a releasable crawler to virtually mark interesting (e.g., suspect) portions of a structure (e.g., pipe) encountered during inspection or maintenance of the structure, together with a UAV for performing wireless localization using the virtual markers, according to an embodiment.
Figure 7B:
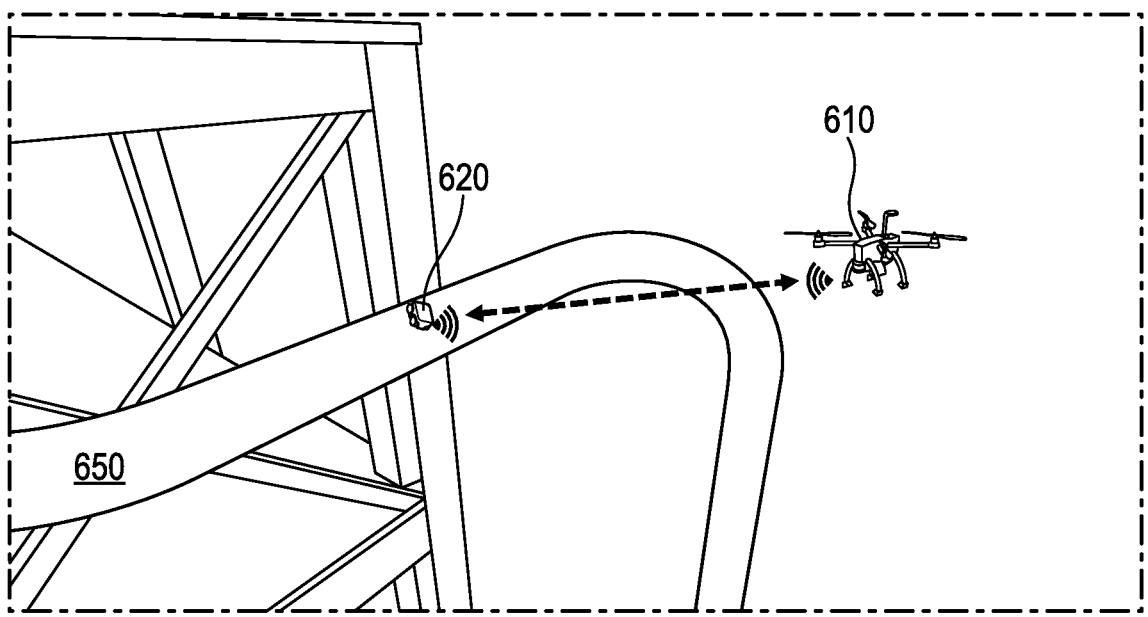

FIGS. 7A and 7B are illustrations of example techniques for a releasable crawler 620 to virtually mark interesting (e.g., suspect) portions of a structure (e.g., pipe 650) encountered during inspection or maintenance of the structure 650, together with a UAV 610 for performing wireless localization using the virtual markers, according to an embodiment. In FIG. 7A, the UAV 610 is perched on the pipe 650, while in FIG. 7B, the UAV 610 is hovering near the pipe 650, such as at a pre-perching waypoint.

In further detail, the location of faults can be determined using virtual markers (e.g., without using physical markers), albeit with a possible loss of precision. Here, the UAV 610 is programmed (or otherwise configured) to compute the crawler location with respect to the UAV 610 using wireless sensors. More specifically, in one embodiment, the UAV 610 carries an ultra-wide band (UWB) sensor array that receives wireless signals broadcast from an UWB transmitter that is mounted on the crawler 620. The crawler's relative location is measured regardless if the UAV 610 is in flight (e.g., FIG. 7B) or attached to the pipe 650 (e.g., FIG. 7A).

In one embodiment, the UAV 610 is programmed (or otherwise configured) so that whenever a fault is detected by the crawler 620 while crawling (e.g., maneuvering and inspecting on the pipe 650), the crawler's location with respect to the UAV 610 is tagged and captured. Together with the UAV's GPS sensor, the UAV 610 is further programmed to find (e.g., compute, determine) the absolute positions of these faults. In an embodiment, for situations where GPS is not available, the UAV 610 is programmed (or otherwise configured) to estimate the UAV's location based on sensor or other instrumentation data such as flight trajectory and IMU data from its home base (e.g., where GPS is available).

Figure 8:
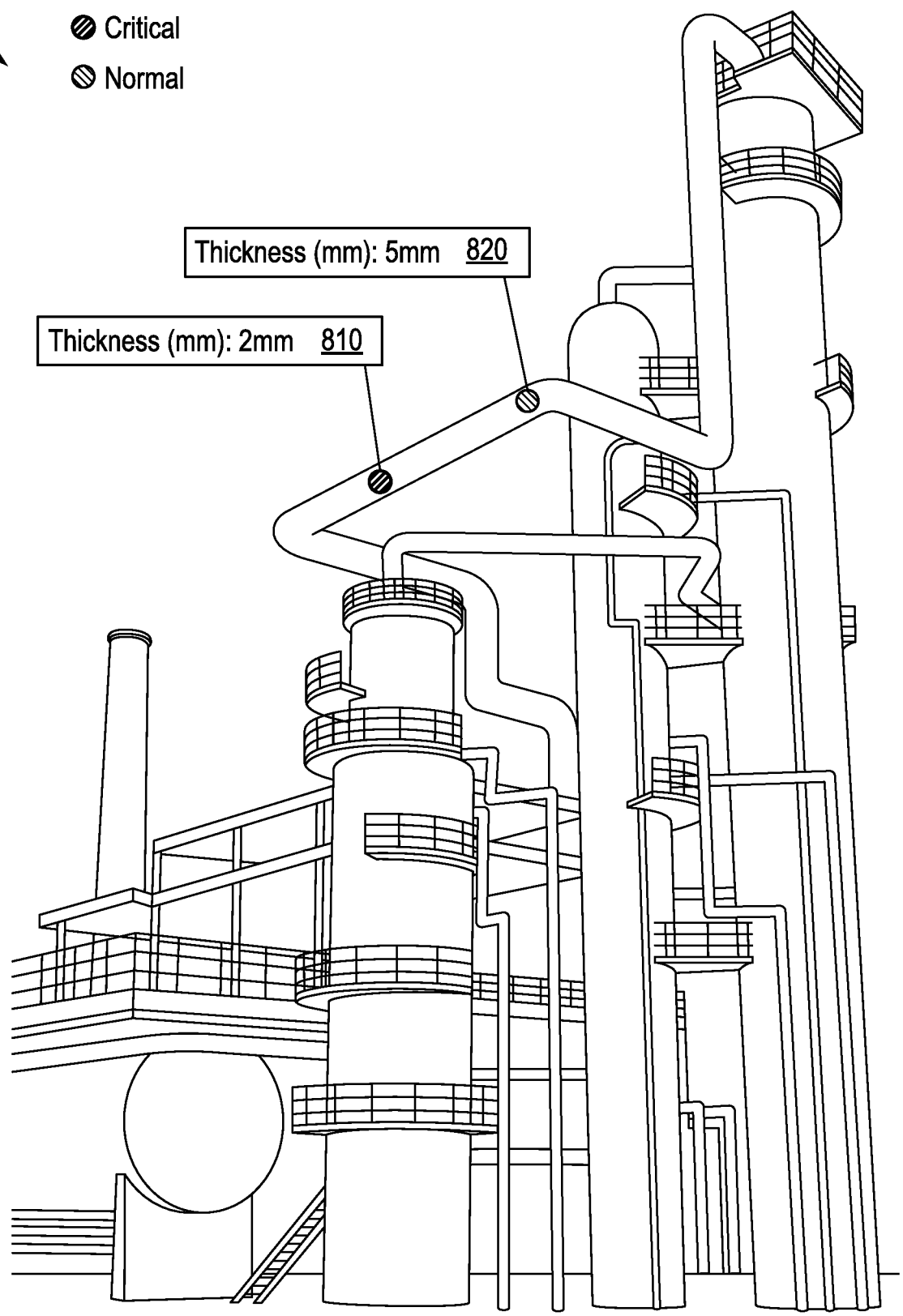
FIG. 8 is an example structure for deploying a UAV with a releasable crawler to inspect or maintain the structure, according to an embodiment.

FIG. 8 is an example structure 800 for deploying a UAV with a releasable crawler to inspect or maintain the structure, according to an embodiment. In the structure 800 of FIG. 8, and more specifically on a hard-to-access pipe of the structure 800, the UAV has deployed the crawler to perform thickness determinations (e.g., using a UT sensor). The crawler has marked two example locations 810 and 820. Location 810 corresponds to a section of the pipe whose thickness has reached a critically low value, in this case 2 millimeters (mm). On the other hand, location 820 corresponds to a section of the pipe whose thickness is normal, in this case 5 mm.

In further detail, these inspection points 810 and 820 are part of a mapping and annotation of the structure 800. The UAV and crawler are programmed (or otherwise configured) to perform some or all of this mapping and annotation. In an embodiment, previously computed inspection locations are transferred from the UAV to an operator computer, or a ground station. Then, a computing system is programmed (or otherwise configured) to visualize the inspection locations (e.g., 810 and 820) on a previously built 3D model of the inspected plant 800. In another embodiment, the UAV is programmed (or otherwise configured) to construct a 3D model of portions of the plant 800 using data obtained by the UAV's onboard sensors, e.g., depth camera or 3D LIDAR. In addition, in an embodiment, the UAV is further programmed to annotate the visualized locations with the corresponding measured thicknesses obtained by the crawler when inspecting the structure 800.

Figure 9:
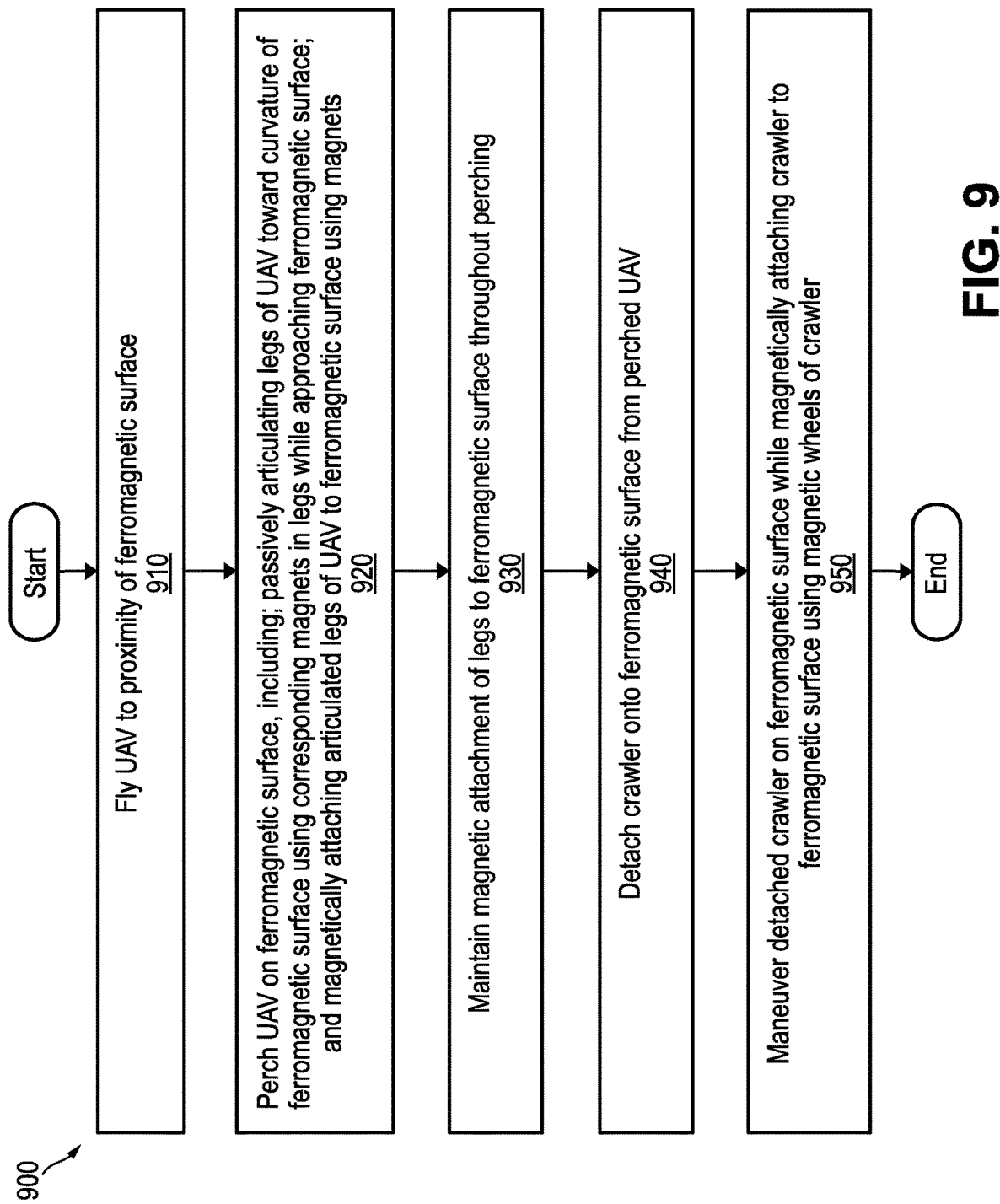
FIG. 9 is a flow chart of an example method of inspecting or maintaining a structure (such as a pipe) having a curved ferromagnetic surface using a UAV with a releasable crawler, according to an embodiment.

FIG. 9 is a flow chart of an example method 900 of inspecting or maintaining a structure (such as a pipe, as in pipe 50, 150, 555, or 650) having a curved ferromagnetic surface using a UAV (such as UAV 100, 200, 300, 400, 505, or 610) with a releasable crawler (such as releasable crawler 130, 260, 535, or 620), according to an embodiment.

Some or all of the method 900 can be performed using components and techniques illustrated in FIGS. 1A through 8. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 900 (or other disclosed method) to be carried out. It should be noted that in other embodiments, the order of the operations can be varied, and that some of the operations can be omitted. Some or all of the method 900 can also be performed using logic, circuits, or processors located on a UAV configured to carry out the method 900.

In the example method 900, processing begins with the step of flying 910 the UAV to a proximity of the ferromagnetic surface, followed by the step of perching 920 the UAV on the ferromagnetic surface. The perching 920 includes passively articulating legs (such as perching legs 280) of the UAV toward the curvature of the ferromagnetic surface using corresponding magnets (such as articulated magnets 120 or 290) in the legs while approaching the ferromagnetic surface. The perching 920 also includes magnetically attaching the articulated legs of the UAV to the ferromagnetic surface using the corresponding magnets. The method 900 further includes the step of maintaining 930 the magnetic attachment of the legs to the ferromagnetic surface throughout the perching, and the step of detaching 940 the crawler onto the ferromagnetic surface from the perched UAV. The method 900 further includes the step of maneuvering 950 the detached crawler on the ferromagnetic surface while magnetically attaching the crawler to the ferromagnetic surface using magnetic wheels (such as magnetic wheels 140 or 270) of the crawler.

In further embodiments, the method 900 includes inspecting or maintaining the ferromagnetic surface during the maneuvering using a probe or tool (such as a UT sensor) of the crawler. In still further embodiments, the method 900 includes breaking the magnetic attachment of the crawler from the ferromagnetic surface and re-docking the detached crawler with the perched UAV after the maneuvering.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method of inspection or maintenance of an outwardly curved ferromagnetic surface exhibiting outward cylindrical or spherical curvature by a crawler flown to and released on the outwardly curved ferromagnetic surface by an unmanned aerial vehicle (UAV), the method comprising:
    flying the UAV and attached releasable crawler to a proximity of the outwardly curved ferromagnetic surface exhibiting the outward cylindrical or spherical curvature;
    perching the UAV and attached releasable crawler on the outwardly curved ferromagnetic surface, comprising:
        passively articulating legs of the UAV toward the outward cylindrical or spherical curvature of the ferromagnetic surface through magnetic attraction using corresponding magnets in the legs while approaching the outwardly curved ferromagnetic surface;
        magnetically attaching the articulated legs of the UAV to the outwardly curved ferromagnetic surface using the corresponding magnets; and
        maintaining the magnetic attachment of the legs to the outwardly curved ferromagnetic surface throughout the perching;
    detaching the attached crawler onto the outwardly curved ferromagnetic surface from the perched UAV;
    maneuvering the detached crawler on the outwardly curved ferromagnetic surface while magnetically attaching the crawler to the outwardly curved ferromagnetic surface using magnetic wheels of the crawler; and
    inspecting or maintaining the outwardly curved ferromagnetic surface using the magnetically attached crawler.

2. The method of claim 1, wherein the outwardly curved ferromagnetic surface comprises a pipe, and maneuvering the detached crawler comprises performing outward circumferential scans of the pipe using the detached crawler.

3. The method of claim 1, wherein inspecting or maintaining the outwardly curved ferromagnetic surface further comprises inspecting or maintaining the outwardly curved ferromagnetic surface during the maneuvering using a probe or tool of the magnetically attached crawler.

4. The method of claim 1, further comprising wirelessly communicating, from the detached crawler, with the UAV or a base station.

5. The method of claim 1, further comprising breaking the magnetic attachment of the crawler from the outwardly curved ferromagnetic surface and re-docking the detached crawler with the perched UAV after the maneuvering.

6. The method of claim 1, further comprising:
    breaking the magnetic attachment of the articulated legs from the outwardly curved ferromagnetic surface in order to magnetically detach the articulated legs from the outwardly curved ferromagnetic surface; and
    flying the magnetically detached legs of the UAV away from the outwardly curved ferromagnetic surface.

7. The method of claim 6, wherein the corresponding magnets comprise switchable permanent magnets, and breaking the magnetic attachment comprises switching the permanent magnets from a magnetized state to an unmagnetized state.

8. The method of claim 6, wherein breaking the magnetic attachment comprises applying leverage to the magnetically attached legs using one or more detachment actuators of the UAV.

9. The method of claim 1, further comprising scanning the proximal outwardly curved ferromagnetic surface using a laser scanner of the flying UAV.

10. The method of claim 1, wherein the outwardly curved ferromagnetic surface comprises a pipe or a storage tank.

11. A method of inspection or maintenance of an outwardly curved ferromagnetic surface exhibiting outward cylindrical or spherical curvature by a crawler flown to and released on the outwardly curved ferromagnetic surface by an unmanned aerial vehicle (UAV), the method comprising:
    flying the UAV and attached releasable crawler from an initial position to a pre-perching position in a vicinity of the outwardly curved ferromagnetic surface exhibiting the outward cylindrical or spherical curvature;

autonomously perching the UAV and attached releasable crawler on the outward cylindrical or spherical curvature of the ferromagnetic surface through magnetic attachment;

maintaining the magnetic attachment of the perched UAV and attached releasable crawler to the outward cylindrical or spherical curvature of the ferromagnetic surface;

releasing the attached crawler from the magnetically attached UAV onto, and magnetically attaching to, the outwardly curved ferromagnetic surface;

moving the released crawler over the outwardly curved ferromagnetic surface while maintaining the magnetic attachment of the released crawler to the outwardly curved ferromagnetic surface;

inspecting or maintaining the outwardly curved ferromagnetic surface using the magnetically attached crawler; and re-docking the released crawler with the perched UAV.

12. The method of claim 11, further comprising wirelessly communicating with the UAV from the released crawler.

13. The method of claim 11, further comprising:
magnetically detaching the perched UAV from the outwardly curved ferromagnetic surface; and
flying the magnetically detached UAV away from the outwardly curved ferromagnetic surface to the pre-perching position.

14. The method of claim 13, wherein flying the magnetically detached UAV comprises not carrying the re-docked crawler, and the method further comprises wirelessly communicating with the flying UAV from the released crawler.

15. The method of claim 11, wherein inspecting or maintaining the outwardly curved ferromagnetic surface comprises marking locations of interest on the outwardly curved ferromagnetic surface.

16. The method of claim 15, wherein inspecting or maintaining the outwardly curved ferromagnetic surface comprises measuring a thickness of the outwardly curved ferromagnetic surface, and the locations of interest comprise locations whose measured thickness is below a critical value.

17. The method of claim 15, further comprising:
magnetically detaching the perched UAV from the outwardly curved ferromagnetic surface;
flying the magnetically detached UAV away from the outwardly curved ferromagnetic surface; and
detecting the marked locations of interest on the outwardly curved ferromagnetic surface from the flying magnetically detached UAV.

18. The method of claim 11, further comprising:
magnetically detaching the perched UAV with the re-docked crawler from the outwardly curved ferromagnetic surface;
flying the magnetically detached UAV with the re-docked crawler away from the outwardly curved ferromagnetic surface to the pre-perching position; and
flying the magnetically detached UAV with the re-docked crawler toward another pre-perching position in a vicinity of a second outwardly curved ferromagnetic surface to be inspected or maintained by the re-docked crawler, the second outwardly curved ferromagnetic surface exhibiting outward cylindrical or spherical curvature.

19. The method of claim 11, further comprising:
magnetically detaching the perched UAV with the re-docked crawler from the outwardly curved ferromagnetic surface; and
flying the magnetically detached UAV with the re-docked crawler away from the outwardly curved ferromagnetic surface to the initial position.

20. The method of claim 11, wherein autonomously perching the UAV comprises sensing the outwardly curved ferromagnetic surface using a depth camera or laser scanner of the UAV in order to produce sensed depth camera or laser scanner data, and touching down on the outwardly curved ferromagnetic surface using the sensed depth camera or laser scanner data.

21. The method of claim 20, wherein
sensing the outwardly curved ferromagnetic surface comprises producing sensed ferromagnetic surface data, and
autonomously perching the UAV further comprises aligning the UAV at a pre-touchdown position using the sensed ferromagnetic surface data.

22. The method of claim 11, wherein the outwardly curved ferromagnetic surface comprises a pipe or a storage tank.

* * * * *

UNITED STATES PATENT AND TRADEMARK OFFICE
CERTIFICATE OF CORRECTION

PATENT NO. : 11,584,458 B2
APPLICATION NO. : 16/694092
DATED : February 21, 2023
INVENTOR(S) : Fadl Abdellatif, Mohamed Abdelkader and Jeff S. Shamma Page 1 of 1

It is certified that error appears in the above-identified patent and that said Letters Patent is hereby corrected as shown below:

On the Title Page

Item [72], first inventor: delete "Fadi Abdellatif" and insert -- Fadl Abdellatif --

Signed and Sealed this
Fourth Day of April, 2023

Katherine Kelly Vidal
*Director of the United States Patent and Trademark Office*